(12) United States Patent
Parker et al.

(10) Patent No.: US 8,924,694 B2
(45) Date of Patent: *Dec. 30, 2014

(54) PACKET DATA MODIFICATION PROCESSOR

(75) Inventors: David K. Parker, Cheltenham (GB);
Erik R. Swenson, San Jose, CA (US);
Christopher J. Young, San Jose, CA (US)

(73) Assignee: Extreme Networks, Inc., San Jose, CA (US)

(*) Notice: Subject to any disclaimer, the term of this patent is extended or adjusted under 35 U.S.C. 154(b) by 13 days.

This patent is subject to a terminal disclaimer.

(21) Appl. No.: 13/444,700

(22) Filed: Apr. 11, 2012

(65) Prior Publication Data

US 2012/0195317 A1 Aug. 2, 2012

Related U.S. Application Data

(63) Continuation of application No. 10/814,556, filed on Mar. 30, 2004, now Pat. No. 8,161,270.

(51) Int. Cl.
*G06F 15/00* (2006.01)
*G06F 7/38* (2006.01)
*G06F 9/00* (2006.01)
*G06F 9/44* (2006.01)

(52) U.S. Cl.
USPC .......................................................... 712/224

(58) Field of Classification Search
None
See application file for complete search history.

(56) References Cited

U.S. PATENT DOCUMENTS

| | | |
|---|---|---|
| 6,223,277 B1 | 4/2001 | Karguth |
| 6,381,242 B1 | 4/2002 | Maher, III et al. |
| 6,650,642 B1 | 11/2003 | Sugai et al. |
| 6,650,644 B1 | 11/2003 | Colley et al. |
| 6,714,987 B1 | 3/2004 | Amin et al. |
| 6,721,316 B1 | 4/2004 | Epps et al. |
| 6,775,280 B1 | 8/2004 | Ma et al. |
| 6,798,746 B1 | 9/2004 | Kloth et al. |
| 6,807,183 B1 | 10/2004 | Chow et al. |
| 6,914,905 B1 | 7/2005 | Yip et al. |

(Continued)

FOREIGN PATENT DOCUMENTS

| | | |
|---|---|---|
| EP | 1443784 A1 | 8/2004 |
| WO | WO-03041437 | 5/2003 |

(Continued)

OTHER PUBLICATIONS

Notice of Allowance for European Patent Application No. 05742926.8, Mailed Jul. 23, 2012, 7 pages.

(Continued)

*Primary Examiner* — Robert Fennema
*Assistant Examiner* — George Giroux
(74) *Attorney, Agent, or Firm* — Blakely, Sokoloff, Taylor & Zafman LLP

(57) ABSTRACT

A programmable processor configured to perform one or more packet modifications through execution of one or more commands. A pipelined processor core comprises a first stage configured to selectively shift and mask data in each of a plurality of categories in response to one or more decoded commands, and combine the selectively shifted and masked data in each of the categories. The pipelined processor core further comprises a second stage configured to selectively perform one or more operations on the combined data from the first stage and other data responsive to the one or more decoded commands. In one implementation, the processor is implemented as an application specific integrated circuit (ASIC).

20 Claims, 48 Drawing Sheets

(56) References Cited

U.S. PATENT DOCUMENTS

| | | | |
|---|---|---|---|
| 6,917,617 | B2 | 7/2005 | Jin et al. |
| 6,957,258 | B2 | 10/2005 | Maher, III et al. |
| 7,002,974 | B1 | 2/2006 | Deerman et al. |
| 7,006,438 | B2 | 2/2006 | West et al. |
| 7,042,848 | B2 | 5/2006 | Santiago et al. |
| 7,079,538 | B2 | 7/2006 | Gazsi et al. |
| 7,116,680 | B1 | 10/2006 | Kramer et al. |
| 7,224,701 | B2 | 5/2007 | Ozguner |
| 7,286,565 | B1 | 10/2007 | Carr |
| 7,292,591 | B2 | 11/2007 | Parker et al. |
| 7,304,991 | B2 | 12/2007 | Basso et al. |
| 7,340,535 | B1 | 3/2008 | Alam |
| 7,463,628 | B2 | 12/2008 | Parker et al. |
| 7,489,699 | B2 | 2/2009 | Sindhu et al. |
| 7,675,915 | B2 | 3/2010 | Parker et al. |
| 2001/0020266 | A1 | 9/2001 | Kojima et al. |
| 2001/0025315 | A1 | 9/2001 | Jolitz |
| 2001/0043610 | A1 | 11/2001 | Nemirovsky et al. |
| 2002/0075805 | A1 | 6/2002 | Gupta et al. |
| 2002/0085560 | A1 | 7/2002 | Cathey et al. |
| 2002/0103925 | A1 | 8/2002 | Sheth et al. |
| 2002/0107908 | A1 | 8/2002 | Dharanikota |
| 2002/0126673 | A1 | 9/2002 | Dagli et al. |
| 2002/0147961 | A1 | 10/2002 | Charters et al. |
| 2002/0163909 | A1 | 11/2002 | Sarkinen et al. |
| 2002/0163935 | A1 | 11/2002 | Paatela et al. |
| 2002/0186661 | A1 | 12/2002 | Santiago |
| 2002/0194363 | A1 | 12/2002 | Jha |
| 2003/0005143 | A1 | 1/2003 | Elzur et al. |
| 2003/0046423 | A1 | 3/2003 | Narad et al. |
| 2003/0056014 | A1 | 3/2003 | Verberkt et al. |
| 2003/0067903 | A1 | 4/2003 | Jorgensen |
| 2003/0126286 | A1 | 7/2003 | Lee |
| 2003/0185220 | A1 | 10/2003 | Valenci |
| 2003/0193949 | A1 | 10/2003 | Kojima et al. |
| 2003/0214905 | A1 | 11/2003 | Solomon et al. |
| 2003/0223361 | A1 | 12/2003 | Hussain et al. |
| 2004/0003110 | A1 | 1/2004 | Ozguner |
| 2004/0049582 | A1 | 3/2004 | Noel, Jr. et al. |
| 2004/0105423 | A1 | 6/2004 | Koehler et al. |
| 2004/0246981 | A1 | 12/2004 | He et al. |
| 2005/0074009 | A1 | 4/2005 | Kanetake et al. |
| 2005/0086353 | A1 | 4/2005 | Shirakawa et al. |
| 2005/0111360 | A1 | 5/2005 | Jin et al. |
| 2005/0117576 | A1 | 6/2005 | McDysan et al. |
| 2005/0149633 | A1 | 7/2005 | Natarajan et al. |
| 2005/0159166 | A1 | 7/2005 | Jonsson et al. |
| 2005/0220011 | A1 | 10/2005 | Parker et al. |
| 2006/0034292 | A1 | 2/2006 | Wakayama et al. |
| 2006/0209796 | A1 | 9/2006 | Scott |
| 2007/0204036 | A1 | 8/2007 | Mohaban et al. |
| 2008/0043628 | A1 | 2/2008 | Parker et al. |
| 2008/0049774 | A1 | 2/2008 | Swenson et al. |
| 2009/0213856 | A1 | 8/2009 | Paatela et al. |

FOREIGN PATENT DOCUMENTS

| | | |
|---|---|---|
| WO | WO-03081857 | 10/2003 |
| WO | WO-2005094343 | 10/2005 |
| WO | WO-2005099178 | 10/2005 |

OTHER PUBLICATIONS

Non-Final Office Action for European Patent Application No. 05732724.9, Mailed Apr. 26, 2012, 7 pages.

Extended European Search Report for European Patent Application No. 12193606.6, Mailed Jan. 17, 2013, 7 pages.

Notice of Allowance and Fees for U.S. Appl. No. 10/814,552, Mailed Nov. 14, 2007, 13 Pages.

Supplemental Notice of Allowance and Fees for U.S. Appl. No. 10/814,552, Mailed Dec. 18, 2007, 8 Pages.

Non-Final Office Action for U.S. Appl. No. 11/860,045 Mailed Nov. 18, 2009, 9 Pages.

Notice of Allowance and Fees for U.S. Appl. No. 11/860,045 Mailed Mar. 29, 2010, 11 Pages.

Notice of Allowance and Fees for U.S. Appl. No. 10/814,725 Mailed Sep. 6, 2007, 15 Pages.

Notice of Allowance and Fees for U.S. Appl. No. 11/924,523 Mailed Dec. 18, 2009, 10 Pages.

Non-Final Office Action for U.S. Appl. No. 10/814,556 Mailed Sep. 17, 2007, 17 Pages.

Final Office Action for U.S. Appl. No. 10/814,556 Mailed Apr. 29, 2008, 20 Pages.

Non-Final Office Action for U.S. Appl. No. 10/814,556 Mailed Apr. 5, 2009, 24 Pages.

Final Office Action for U.S. Appl. No. 10/814,556 Mailed Jun. 22, 2009, 28 Pages.

Non-Final Office Action for U.S. Appl. No. 10/814,556 Mailed Jan. 5, 2010, 28 Pages.

Non-Final Office Action for U.S. Appl. No. 10/814,729 Mailed Oct. 20, 2008, 23 Pages.

Notice of Allowance and Fees for U.S. Appl. No. 10/814,729 Mailed Jul. 10, 2009, 11 Pages.

Notice of Allowance and Fees for U.S. Appl. No. 10/814,729 Mailed Sep. 3, 2009, 9 Pages.

Notice of Restriction Requirement for U.S. Appl. No. 10/814,552, Mailed Aug. 10, 2007, 5 Pages.

Notice of Restriction Requirement for U.S. Appl. No. 10/814,552, Mailed Oct. 11, 2007, 5 Pages.

International Preliminary Report on Patentability for PCT Application PCT/US2005/010541 Mailed Oct. 2, 2008, 6 Pages.

International Search Report and WO for PCT Application PCT/US2005/010541 Mailed Aug. 25, 2008, 10 Pages.

International Preliminary Report on Patentability for PCT Application PCT/US2005/010544 Mailed Oct. 12, 2006, 5 Pages.

International Search Report and WO for PCT Application PCT/US2005/010544 Mailed Jun. 29, 2006, 9 Pages.

Final Office Action for U.S. Appl. No. 10/814,556 Mailed Jul. 6, 2010, 28 Pages.

Notice of Allowance and Fees for U.S. Appl. No. 11/860,045 Mailed Jul. 14, 2010, 14 Pages.

Supplemental Notice of Allowance for U.S. Appl. No. 11/860,045 Mailed Jul. 16, 2010, 6 Pages.

Non-Final Office Action for U.S. Appl. No. 10/814,556 Mailed Dec. 9, 2010, 24 Pages.

European Search Report for European Patent Application No. 05742926.8, mailed Mar. 3, 2011, 3 pages.

Supplemental Search Report for European Patent Application No. 05732724.9, Mailed May 10, 2011, 3 pages.

Final Office Action for U.S. Appl. No. 10/814,556, Mailed Jun. 21, 2011, 24 pages.

Non-Final Office Action for EP Patent Application No. 05742926.8, Mailed Jun. 15, 2011, 8 pages.

Notice of Allowance for U.S. Appl. No. 10/814,556, Mailed Dec. 20, 2011, 12 pages.

Braden, R , et al., "RFC 1071—Computing the Internet Checksum", Sep. 1988, available at: http://www.faqs.org/rfcs/rfc1071.html, 20 Pages.

Mallory, T , et al., "RFC 1141—Incremental Updating of the Internet Checksum", Jan. 1990, available at: htt;://www.faqs.org/rfcs/rfc1141.html, 3 Pages.

Netlogic Microsystems, "Product Brief NSE5000GLQ", Copyright 2004, available at: http://www.netlogicmicro.com/datasheets/nse5000glq.html, 3 Pages.

Rijsinghani, A , et al., "RFC 1624—Computation of the Internet Checksum via Incremental Update", May 1994, available at: http://www.faqs.org/rfcs/rfc1624.html, 5 Pages.

Van Ess, D , "A Circular FIFO, PSoC Style", Cypress Microsystems, Application Note AN2036, Rev. B, Jun. 21, 2002, 5 Pages.

Zhang, Zheng , "Recovery of Memory and Process in SDM Systems: HA Issue #1", Hewlett-Packard Co. HPL-2001-76, Mar. 30, 2001, 16 Pages.

Non-Final Office Action for European Patent Application No. 05732724.9, Mailed Oct. 9, 2013, 8 pages.

| BIT | FUNCTION | DESCRIPTION |
|---|---|---|
| 15-0 | PTI | PORT TAG INDEX. |
| 19-16 | EQoS | EGRESS QUEUE SELECT. |
| 23-20 | LAI | LAI INDEX. |
| 24 | JUMBO | EGRESS JUMBO CHECK FLAG. |
| 25 | DON'T FRAG | DON'T FRAGMENT FLAG. |
| 26 | IF TYPE | INGRESS INTERFACE TYPE. 0 = ETHERNET, 1 = POS INTERFACE. |
| 27 | - | RESERVED. |
| 28 | ROUTE | ROUTE FLAG. |
| 29 | RED | RANDOM EARLY DROP. |
| 31-30 | CTL | AFH FORMAT TYPE. |
| 51-32 | TXMI | TRANSMIT MODIFICATION INDEX. |
| 58-52 | CQoS | CPU QUEUE SELECT. |
| 59 | CPU COPY | CPU COPY FLAG. |
| 60 | REDIRECT | REDIRECT FLAG. |
| 61 | SSAMPLE | STATISTICAL SAMPLE FLAG. |
| 62 | LEARN | LEARN FLAG. REQUESTS OT TO SEND A COPY OF THE PACKET TO THE CPU FOR LEARN PROCESSING. |
| 63 | EMIRROR | EGRESS MIRROR. |
| 75-64 | IQoS | INGRESS QUEUE SELECT. |
| 78-76 | EMRK SEL | EGRESS MARK SELECT. |
| 81-79 | EMRK MASK | EGRESS MARK MASK. |
| 82 | IMIRROR | INGRESS MIRROR. |
| 83 | PERR KILL | PARITY ERROR KILL. |

FIG. 2

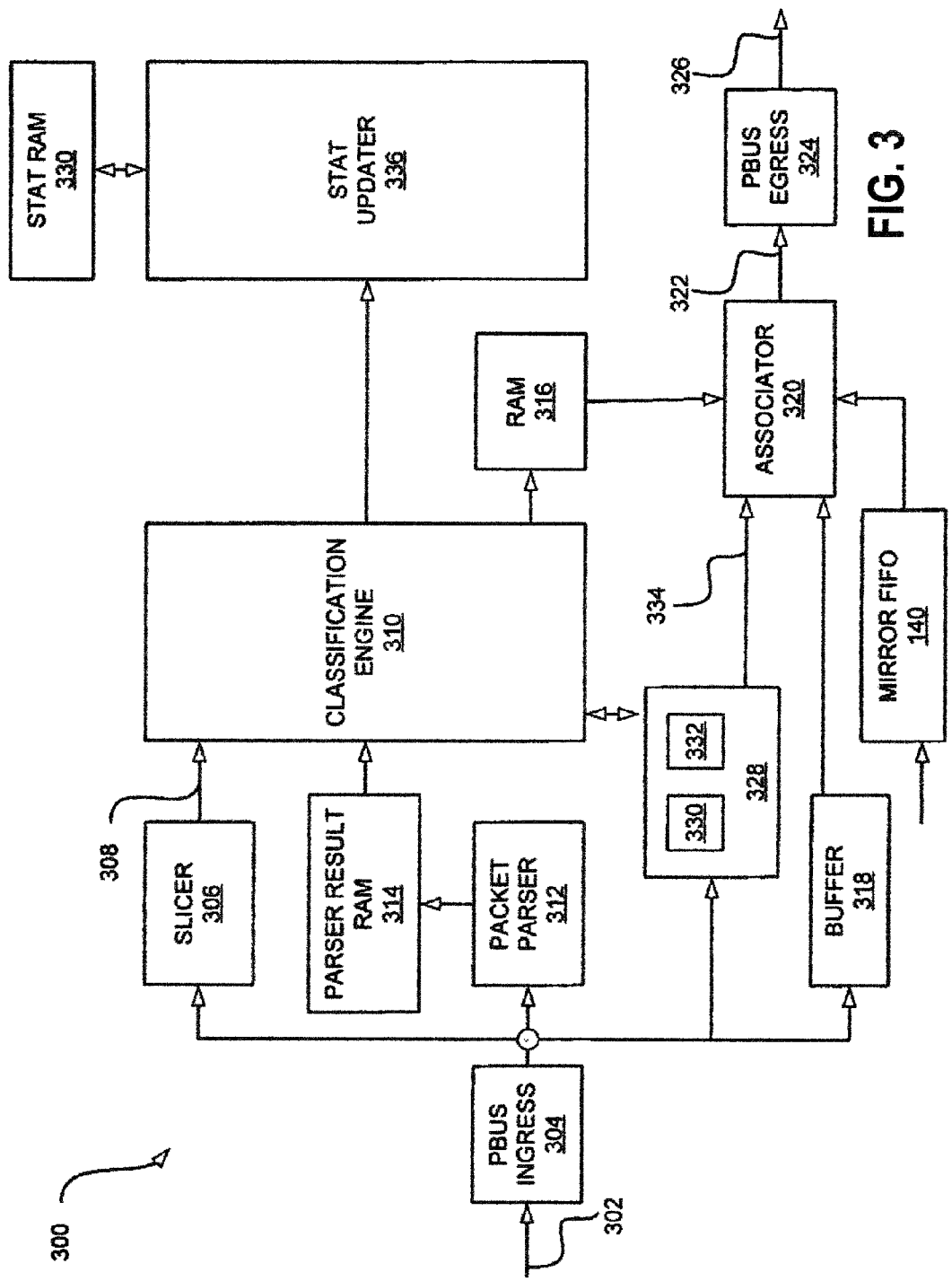

10.4.1.1. External Link Entry Format

| Bit | Function | Description |
|---|---|---|
| 17–0 | BURST ADDR 0 | Burst Address 0. |
| 21–18 | BURST LEN 0 | Burst Length 0. |
| 41–22 | BURST ADDR 1 | Burst Address 1. |
| 45–42 | BURST LEN 1 | Burst Length 1. |
| 65–46 | BURST ADDR 2 | Burst Address 2. |
| 69–66 | BURST LEN 2 | Burst Length 2. |
| 70 | INT/EXT | Internal/External |
| 71 | PAR | Parity Bit. Set so that there is odd parity across bits 71:0 of the entry data. |

10.4.1.2. Internal Link Entry Format

| Bit | Function | Description |
|---|---|---|
| 20-0 | BURST ADDR 1 | Burst Address 1. |
| 25-21 | BURST LEN 1 | Burst Length 1. |
| 46-26 | BURST ADDR 2 | Burst Address 2. |
| 51-47 | BURST LEN 2 | Burst Length 2. |
| 62-52 | INT RECIPE INDEX | Internal Recipe Index. |
| 67-63 | INT RECIPE LEN | Internal Recipe Length. |
| 69-68 | — | Reserved. |
| 70 | INT/EXT | Internal/External |
| 71 | PAR | Parity Bit. Set so that there is odd parity across bits 71:0 of the entry data. |

10.4.1.4. Data Entry Format

| Bit | Function | Description |
|---|---|---|
| 31-0 | DATA 0 | Data Segment 0. |
| 35-32 | DATA LEN | Data Length. |
| 67-36 | DATA 1 | Data Segment 1. |
| 70-68 | — | Reserved. |
| 71 | PAR | Parity Bit. Set so that there is odd parity across bits 71:0 of the entry data. |

FIG. 21A

| TXM Data/Mask Format inside the external TXM RAM |||||||
|---|---|---|---|---|---|---|
| Parity[71] | Reserved[70:68] | Mask2[67:60] | Data2[59:44] | Data1[43:36] | Length[3:0] | Mask[31:16] | Data0[15:0] |
| Parity[71] | Reserved[70:68] | Unused[67:36] |||Length[3:0] | Unused[31:8] | Mask2[7:0] |

FIG. 21B

| Internal Recipe RAM Data Format | | | |
|---|---|---|---|
| [71] | [70] | [69:36] | [35:34] | [33:0] |
| Parity | Command (n+1) valid | Command (n+1) | Reserved | Command(n) |

FIG. 22

| Opcode | Command Mnemonic | Control Information | Data Fields |
|---|---|---|---|
| 00000 | TXM_CMD_NOP | - | - |
| 00001 | TXM_CMD_INSERT | Offset, Length | Insertion Data |
| 00010 | TXM_CMD_DELETE | Offset, Length | - |
| 00011 | TXM_CMD_REPLACE | Offset, Length | Replacement Data |
| 00100 | TXM_CMD_REPLACE_MASK | Offset, Length | Replacement Data/Mask |
| 00101 | TXM_CMD_COPY | Offset Source, Offset Destination, Length | - |
| 00110 | TXM_CMD_COPY_MASK | Offset Source, Offset Destination, Length | Copy Mask |
| 00111 | TXM_CMD_COPY_INS | Offset Source, Offset Destination, Length | - |
| 01000 | TXM_CMD_COPY_INS_MASK | Offset Source, Offset Destination, Length | Copy Mask |
| 01001 | TXM_CMD_MACRO1 | VDEL, MCAST flags, MAC DA, MAC SA, VLAN | MAC DA, MAC SA |
| 01010 | TXM_CMD_MACRO2 | VDEL, MCAST flags, MAC DA, MAC SA, VLAN | MAC DA, MAC SA |
| 01011- 01100 | RESERVED | - | - |
| 01101 | TXM_CMD_ACL | Index, VPORT | - |
| 01110 | TXM_CMD_EMC_VPRI | VPRI-EXP EMC fields | - |
| 01111 | TXM_CMD_EMC_IPTOS | IPTOS EMC fields | - |
| 10000 | TXM_CMD_INCREMENT_INSERT | Offset, Length | - |
| 10001 | TXM_CMD_INCREMENT_REPLACE | Offset, Length | - |
| 10010 | TXM_CMD_DECREMENT | Offset, Length | - |
| 10011 | TXM_CMD_AND | Offset, Length | ALU Data |
| 10100 | TXM_CMD_OR | Offset, Length | ALU Data |
| 10101 | TXM_CMD_XOR | Offset, Length | ALU Data |
| 10110 | TXM_CMD_ADD | Offset, Length | ALU Data |
| 10111 | TXM_CMD_SUB | Offset, Length | ALU Data |
| 11000 | TXM_TTL_DECREMENT | MCAST/BCAST flags | TTL decrement limit registers |
| 11001 | TXM_TC_INCREMENT | - | TC limit register |
| 11010 | TXM_TTL_DECREMENT_INS | MCAST/BCAST flags | TTL decrement limit registers |
| 11011 | TXM_TC_INCREMENT_INS | - | TC limit register |
| 11100- 11111 | Reserved | - | - |

FIG. 25

|         | txmi_cmd_replace_da | (Context: L2, Offset: 0, Length 6) |
|         | txmi_cmd_data | MAC DA (6 bytes external) |
| OPT1: | txmi_cmd_replace_sa | (Context: L2, Offset: 6, Length 6) |
|         | txmi_data | MAC SA (6 bytes external) |
| OPT2: | txmi_cmd_replace_sa | (Context: L2, Offset: 6, Length 6) |
|         | txmi_data | Internal SA Pointer |
| OPT3: | txmi_cmd_vlan_delete_replace | (Context: L2, Offset: 14, Length 2) |
|         | txmi_data | VLAN (2 bytes external) |

OPT1: If configuration register flag (use_internal_mac_sa) is set to 0 then the MAC SA will be read from the external TXM RAM.

OPT2: If configuration register flag (use_internal_mac_sa) is set to 1 then the MAC SA data will come from the internal register in the source field of the command (0 – 15).

OPT3: If the VDEL flag is set to 1 the VLAN field will be deleted else the VLAN field will be replaced with external TXM data.

FIG. 26 txmi_cmd_replace_da (Context: L2, Offset: 0, Length 6)
txmi_cmd_data MAC DA (6 bytes external)
OPT1: txmi_cmd_replace (Context: L2, Offset: 6, Length 6)
txmi_cmd_data MAC SA (6 bytes external)
OPT2: txmi_cmd_replace_sa (Context: L2, Offset: 6, Length 6)
txmi_data Internal SA Pointer OPT3: txmi_cmd_vlan_delete (Context: L2, Offset: 14, Length 2)

OPT1: If configuration register flag (use_internal_mac_sa) is set to 0 then the MAC SA will be read from the external TXM RAM.
OPT2: If configuration register flag (use_internal_mac_sa) is set to 1 then the MAC SA data will come from the internal register in the source field of the command (0 – 15).
OPT3: If the VDEL flag is set to 1 the VLAN field will be deleted else the txmi_cmd_vlan_delete command will be converted to a txmi_cmd_nop command.

FIG. 27

```
if broadcast IP packets
    if (TTL>IPbcast_TTL_Limit[sub_channel])
        Decrement TTL
        continue with next operation
    else
        Drop the packet
else if multicast IP packets
    if (TTL>IPmcast_TTL_Limit[sub_channel])
        Decrement TTL
        continue with next operation
    else
        Drop the packet
else // Must be unicast IP packets
    if (TTL>Ibucast_TTL_Limit[sub_channel])
        Decrement TTL
        continue with next operation
    else
        Drop the packet
```

FIG. 28

```
if (TC<TC_Limit(sub_channel))
        Increment TTL continue with next operation
else
        Drop the packet
```

FIG. 29

| Error Flag | Error Description | Action |
|---|---|---|
| 0 | ALU & Copy commands > packet size | Flag packet to be killed |
| 1 | Destination address is ahead of current read pointer | Flag packet to be killed |
| 2 | ALU & Copy commands > packet size | Flag packet to be killed |
| 3 | Reserved Opcode detected in the pipeline | Flag packet to be killed |
| 4 | Context1 < Context0 | Flag packet to be killed |
| 5 | Context2 < Context1 | Flag packet to be killed |
| 6 | Context3 < Context2 | Flag packet to be killed |
| 7 | Context4 < Context3 | Flag Packet to be killed |
| 8 | Context5 < Context4 | Flag packet to be killed |
| 9 | Context6 < Context5 | Flag packet to be killed |
| 10 | TTL < limit or TC > limit | Flag packet to be killed |
| 11 | TXM_IN_DATA_RAM Parity Error | Flag packet to be killed |
| 12 | Tx Workbuf Parity Error | Flag packet to be killed |
| 13 | TRAM or Internal Recipe RAM Parity Error | Flag packet to be killed |
| 14 | Packet modification > 0x80 | Flag packet to be killed |

FIG. 32

| Forwarding Process Operation | Modification Type | Size (Bytes) | Packet Offset(s) |
|---|---|---|---|
| Next Hop MAC DA Replacement | Replace | 6 | 0 (MAC) |
| Next Hop VLAN ID Replacement | Masked Replace | 2 | 12 (MAC) |
| Source Address Insertion | Replace | 6 | 6 (MAC) |
| TTL Decrement IPv4 | Decrement | 1 | 8 (NETWORK) |
| MPLS Stack Single Entry Add/Delete | Insert / Delete | 4 | 0 (MPLS) |
| MPLS Stack Double Entry Add/Delete | Insert / Delete | 8 | 0 (MPLS) |
| MPLS Label Change | Replace (could be masked to preserve CoS bits) | 4 | 0 (MPLS) |
| MPLS TTL Decrement | Decrement | 1 | 3 (MPLS) |
| MPLS TTL Copy | Copy | 1 | 3 (MPLS) to 8 (NETWORK) |
| MPLS EtherType Replace/Restore | Replace | 2 | 0 (LLC) |
| IPv4 Encapsulate/De-Encapsulate | Insert / Delete | 20 | 0 (NETWORK) |

FIG. 35

| CMD Function | CMD # | TXM CMD MNEUMONIC | Source Context | Source Offset | Destination Context | Destination Offset | Length |
|---|---|---|---|---|---|---|---|
| Replace MAC DA | 1 | TXM_CMD_REPLACE | -- | -- | L2 | 0 | 6 |
|  |  | TXM_CMD_DATA | -- | -- | -- | -- | 6 |
| Replace MAC SA | 2 | TXM_CMD_REPLACE | -- | -- | L2 | 6 | 6 |
|  |  | TXM_CMD_DATA | -- | -- | -- | -- | 6 |
| Replace VLAN ID | 3 | TXM_CMD_REPLACE | -- | -- | L2 | 14 (no DID) | 2 |
|  |  | TXM_CMD_DATA | -- | -- | -- | -- | 2 |
| TTL Decrement IPv4 | 4 | TXM_CMD_DECREMENT | L3 | 8 | L3 | 8 | 1 |

FIG. 36

| CMD Function | CMD # | TXM CMD MNEUMONIC | Source Context | Source Offset | Destination Context | Destination Offset | Length |
|---|---|---|---|---|---|---|---|
| Replace MAC DA | 1 | TXM_CMD_REPLACE | -- | -- | L2 | 0 | 6 |
|  |  | TXM_CMD_DATA |  |  | - | - | 6 |
| Replace MAC SA | 2 | TXM_CMD_REPLACE | -- | -- | L2 | 6 | 6 |
|  |  | TXM_CMD_DATA |  |  | - | - | 6 |
| Replace VLAN ID | 3 | TXM_CMD_REPLACE | -- | -- | L2 | 14 | 2 |
|  |  | TXM_CMD_DATA |  |  | - | - | 2 |
| Ipv4 Encap | 4 | TXM_CMD_INSERT | -- | -- | L3 Outer | 0 | 7 |
| TTL Decrement | 5 | TXM_CMD_DECREMENT INSERT | L3 Outer | 8 | - | - | 1 |
| IPv4 Encap | 6 | TXM_CMD_INSERT | -- | -- | L3 Outer | 0 | 8 |
|  |  | TXM_CMD_DATA |  |  | - | - | 8 |
| IPv4 Encap | 7 | TXM_CMD_INSERT | -- | -- | L3 Outer | 0 | 4 |
|  |  | TXM_CMD_DATA |  |  | - | - | 4 |

FIG. 37

| CMD Function | CMD # | TXM CMD MNEUMONIC | Source Context | Source Offset | Destination Context | Destination Offset | Length |
|---|---|---|---|---|---|---|---|
| Replace MAC DA | 1 | TXM_CMD_REPLACE |  |  | L2 | 0 | 6 |
|  |  | TXM_CMD_DATA |  |  |  |  | 6 |
| Replace MAC SA | 2 | TXM_CMD_REPLACE |  |  | L2 | 6 | 6 |
|  |  | TXM_CMD_DATA |  |  |  |  | 6 |
| Replace VLAN ID | 3 | TXM_CMD_REPLACE |  |  | L2 | 14 (no DID) | 2 |
|  |  | TXM_CMD_DATA |  |  |  |  | 2 |
| IPV4 de-encapsulate | 4 | TXM_CMD_DELETE |  |  | L3 Outer | 0 | 0 |
| Decrement Inner TTL | 5 | TXM_TTL_DECREMENT | L3 Inner | 8 | L3 Inner | 8 | 1 |

FIG. 38

| CMD Function | CMD # | TXM CMD MNEUMONIC | Source Context | Source Offset | Destination Context | Destination Offset | Length |
|---|---|---|---|---|---|---|---|
| Replace MAC DA | 1 | TXM_CMD_REPLACE | -- | -- | L2 | 0 | 6 |
| | | TXM CMD DATA | -- | -- | -- | -- | 6 |
| Replace MAC SA | 2 | TXM_CMD_REPLACE | -- | -- | L2 | 6 | 6 |
| | | TXM CMD DATA | -- | -- | -- | -- | 6 |
| Replace VLAN ID | 3 | TXM CMD REPLACE | -- | -- | L2 | 14 | 2 |
| | | TXM CMD DATA | -- | -- | -- | -- | 2 |
| Ipv6 Encap | 4 | TXM CMD INSERT | -- | -- | L3 Outer | 0 | 7 |
| | | TXM CMD DATA | -- | -- | -- | -- | 7 |
| TTL Decrement | 5 | TXM_CMD_DECREMENT INSERT | L3 Outer | 8 | L3 Outer | 0 | 1 |
| Ipv6 Encap | 6 | TXM CMD INSERT | -- | -- | L3 Outer | 0 | 8 |
| | | TXM CMD DATA | -- | -- | -- | -- | 8 |
| Ipv6 Encap | 7 | TXM CMD INSERT | -- | -- | L3 Outer | 0 | 8 |
| | | TXM CMD DATA | -- | -- | -- | -- | 8 |
| Ipv6 Encap | 8 | TXM CMD INSERT | -- | -- | L3 Outer | 0 | 8 |
| | | TXM CMD DATA | -- | -- | -- | -- | 8 |
| Ipv6 Encap | 9 | TXM CMD INSERT | -- | -- | L3 Outer | 0 | 8 |
| | | TXM CMD DATA | -- | -- | -- | -- | 8 |

FIG. 39

| CMD Function | CMD # | TXM CMD MNEUMONIC | Source Context | Source Offset | Destination Context | Destination Offset | Length |
|---|---|---|---|---|---|---|---|
| Replace MAC DA | 1 | TXM_CMD_REPLACE | - | - | L2 | 0 | 6 |
|  |  | TXM_CMD_DATA | - | - | - | - | 6 |
| Replace MAC SA | 2 | TXM_CMD_REPLACE | - | - | L2 | 6 | 6 |
|  |  | TXM_CMD_DATA | - | - | - | - | 6 |
| Replace VLAN ID | 3 | TXM_CMD_REPLACE | - | - | L2 | 14 | 2 |
|  |  | TXM_CMD_DATA | - | - | - | - | 2 |
| IPv6 Encap | 4 | TXM_CMD_INSERT | - | - | L3 Outer | 0 | 7 |
|  |  | TXM_CMD_DATA | - | - | - | - | 7 |
| TTL Decrement | 5 | TXM_CMD_DECREMENT INSERT | L3 Outer | 8 | - | - | 1 |
| IPv6 Encap | 6 | TXM_CMD_INSERT | - | - | L3 Outer | 0 | 8 |
|  |  | TXM_CMD_DATA | - | - | - | - | 8 |
| IPv6 Encap | 7 | TXM_CMD_INSERT | - | - | L3 Outer | 0 | 8 |
|  |  | TXM_CMD_DATA | - | - | - | - | 8 |
| IPv6 Encap | 8 | TXM_CMD_INSERT | - | - | L3 Outer | 0 | 8 |
|  |  | TXM_CMD_DATA | - | - | - | - | 8 |
| IPv6 Encap | 9 | TXM_CMD_INSERT | - | - | L3 Outer | 0 | 8 |
|  |  | TXM_CMD_DATA | - | - | - | - | 8 |

FIG. 40

| CMD Function | CMD # | TXMI CMD MNEUMONIC | Source Context | Source Offset | Destination Context | Destination Offset | Length |
|---|---|---|---|---|---|---|---|
| Last Hope Route Address | 1 | TXMI_CMD_COPY | L3 | 10 | L2 | 0 | 6 |
| Replace MAC SA | 2 | TXMI_CMD_REPLACE | -- | -- | L2 | 6 | 6 |
| | | TXMI_CMD_DATA | -- | -- | -- | -- | 6 |
| Replace VLAN ID | 3 | TXMI_CMD_REPLACE | -- | -- | L2 | 14 | 2 |
| | | TXMI_CMD_DATA | -- | -- | -- | -- | 2 |
| Increment TC | 4 | TXMI_CMD_INCREMENT | L3 | 5 | L3 | 5 | 1 |

FIG. 41

| CMD Function | CMD # | TXM CMD MNEUMONIC | Source Context | Source Offset | Destination Context | Destination Offset | Length |
|---|---|---|---|---|---|---|---|
| Replace MAC DA | 1 | TXM_CMD_REPLACE | - | - | L2 | 0 | 6 |
| | | TXM_CMD_DATA | - | - | - | - | 6 |
| Replace MAC SA | 2 | TXM_CMD_REPLACE | - | - | L2 | 6 | 6 |
| | | TXM_CMD_DATA | - | - | - | - | 6 |
| Replace VLAN ID | 3 | TXM_CMD_REPLACE | - | - | L2 | 14 | 2 |
| | | TXM_CMD_DATA | - | - | - | - | 2 |
| Replace EtherType | 4 | TXM_CMD_REPLACE | - | - | Ether | 0 | 2 |
| MPLS Label Insert | 5 | TXM_CMD_INSERT | - | - | MPLS | 0 | 3 |
| | | TXM_CMD_DATA | - | - | - | - | 3 |
| TTL Decrement | 6 | TXM_CMD_DECREMENT | L3 | 8 | MPLS | 3 | 1 |

FIG. 42

| CMD Function | CMD # | TXM CMD MNEUMONIC | Source Context | Source Offset | Destination Context | Destination Offset | Length |
|---|---|---|---|---|---|---|---|
| Replace MAC DA | 1 | TXM_CMD_REPLACE | - | - | L2 | 0 | 6 |
|  |  | TXM_CMD_DATA | - | - | - | - | 6 |
| Replace MAC SA | 2 | TXM_CMD_REPLACE | - | - | L2 | 6 | 6 |
|  |  | TXM_CMD_DATA | - | - | - | - | 6 |
| Replace VLAN ID | 3 | TXM_CMD_REPLACE | - | - | L2 | 14 | 2 |
|  |  | TXM_CMD_DATA | - | - | - | - | 2 |
| Replace EtherType | 4 | TXM_CMD_REPLACE | - | - | Ether | 0 | 2 |
| MPLS Label Insert | 5 | TXM_CMD_INSERT | - | - | MPLS | 0 | 3 |
|  |  | TXM_CMD_DATA | L3 | 8 | - | - | 3 |
| TTL Decrement | 6 | TXM_CMD_DECREMENT | - | - | MPLS | 3 | 1 |
| MPLS Label Insert | 7 | TXM_CMD_INSERT | - | - | MPLS | 4 | 3 |
| TTL Decrement | 8 | TXM_CMD_DECREMENT | L3 | 8 | MPLS | 7 | 1 |

FIG. 43

| CMD Function | CMD # | TXM CMD MNEUMONIC | Source Context | Source Offset | Destination Context | Destination Offset | Length |
|---|---|---|---|---|---|---|---|
| Replace MAC DA | 1 | TXM_CMD_REPLACE | - | - | L2 | 0 | 6 |
|  |  | TXM_CMD_DATA | - | - | - | - | 6 |
| Replace MAC SA | 2 | TXM_CMD_REPLACE | - | - | L2 | 6 | 6 |
|  |  | TXM_CMD_DATA | - | - | - | - | 6 |
| Replace VLAN ID | 3 | TXM_CMD_REPLACE | - | - | L2 | 14 | 2 |
|  |  | TXM_CMD_DATA | - | - | - | - | 2 |
| MPLS Label Insert | 4 | TXM_CMD_INSERT | - | - | MPLS | 0 | 3 |
|  |  | TXM_CMD_DATA | - | - | - | - | 3 |
| TTL Decrement | 5 | TXM_CMD_DECREMENT | L3 | 8 | MPLS | 3 | 1 |

FIG. 44

| CMD Function | CMD # | TXM CMD MNEUMONIC | Source Context | Source Offset | Destination Context | Destination Offset | Length |
|---|---|---|---|---|---|---|---|
| Replace MAC DA | 1 | TXM_CMD_REPLACE | - | - | L2 | 0 | 6 |
| | | TXM_CMD_DATA | - | - | - | - | 6 |
| Replace MAC SA | 2 | TXM_CMD_REPLACE | - | - | L2 | 6 | 6 |
| | | TXM_CMD_DATA | - | - | - | - | 6 |
| Replace VLAN ID | 3 | TXM_CMD_REPLACE | - | - | L2 | 14 | 2 |
| | | TXM_CMD_DATA | - | - | - | - | 2 |
| TTL Decrement | 4 | TXM_CMD_DECREMENT | L3 | 8 | L3 | 8 | 1 |
| Replace IP DA or SA | 5 | TXM_CMD_REPLACE | L3 | 12/16 | L3 | 12/16 | 4 |
| | | TXM_CMD_DATA | - | - | - | - | 4 |
| Replace TCP/UDP Source or Dest port | 5 | TXM_CMD_REPLACE | L4 | 0/2 | L4 | 0/2 | 2 |
| | | TXM_CMD_DATA | - | - | - | - | 2 |

FIG. 45

PACKET DATA MODIFICATION PROCESSOR

CROSS REFERENCE TO RELATED APPLICATIONS

This continuation application claims the benefit of U.S. application Ser. No. 10/814,556 filed on Mar. 30, 2004 now U.S. Pat. No. 8,161,270 entitled "PACKET DATA MODIFICATION PROCESSOR", the entire contents of which are hereby incorporated by reference in its entirety for all purposes.

FIELD OF THE INVENTION

This invention relates to the field of packet processing, and more specifically, to packet modification.

RELATED ART

Prior approaches for modifying packet data are generally implemented through dedicated hardware, and allow for only limited and fixed categories of modifications such as the insertion or deletion of a VLAN, the replacement of a MAC Destination Address/Source Address (DNSA), the decrementing of the Time To Live (TTL) field, or the incrementing of the TC field. For example, in one approach, VLAN insertion/deletion is performed in the MAC by a dedicated serial shift register and a hard coded state machine, and MAC DNSA replacement and TTL decrementing is performed by a dedicated multi-plexor. These approaches are inflexible and cannot accommodate the diverse types of packet modification operations required in current packet switching environments. Software-based approaches, in which packet modification operations are performed by RISC processors or Network processors, are also possible, but these approaches are insufficiently tailored to packet operations and are therefore inefficient.

SUMMARY OF THE INVENTION

A programmable processor configured to perform one or more packet modifications is provided. A pipelined processor core is configured to modify a packet through execution of one or more commands. The pipelined processor core includes a first stage configured to selectively shift and mask data in each of several categories, including packet data and other data, responsive to one or more decoded commands, and combine the selectively shifted and masked data in each of the categories. The pipelined processor core also includes a second stage configured to selectively perform one or more arithmetic operations on the combined data from the first stage and other data, responsive to the one or more decoded commands.

Related methods are also provided. Other systems, methods, features and advantages of the invention or combinations of the foregoing will be or will become apparent to one with skill in the art upon examination of the following figures and detailed description. It is intended that all such additional systems, methods, features, advantages and combinations be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 2 illustrates an example of the format of a packet header as produced by an embodiment of a packet classification system in a packet processing system.

FIG. 3 is a block diagram of an embodiment of a receive-side packet classification system.

FIG. 19 illustrates one example of the format of an external link entry.

FIG. 20 illustrates one example of the format of an internal link entry.

FIGS. 21A-21B illustrate examples of the format of a data entry.

FIG. 22 illustrates one example of the format of a recipe entry.

FIG. 25 illustrates one example of a recipe command instruction set.

FIGS. 26-29 is pseudo-code illustrating operation of various commands or macros in the instruction set of FIG. 25.

FIG. 32 illustrates one example of the exception conditions generated by the modification processor.

FIGS. 35-45 illustrate examples of commands for performing various packet modification operations.

DETAILED DESCRIPTION

Figure 1:
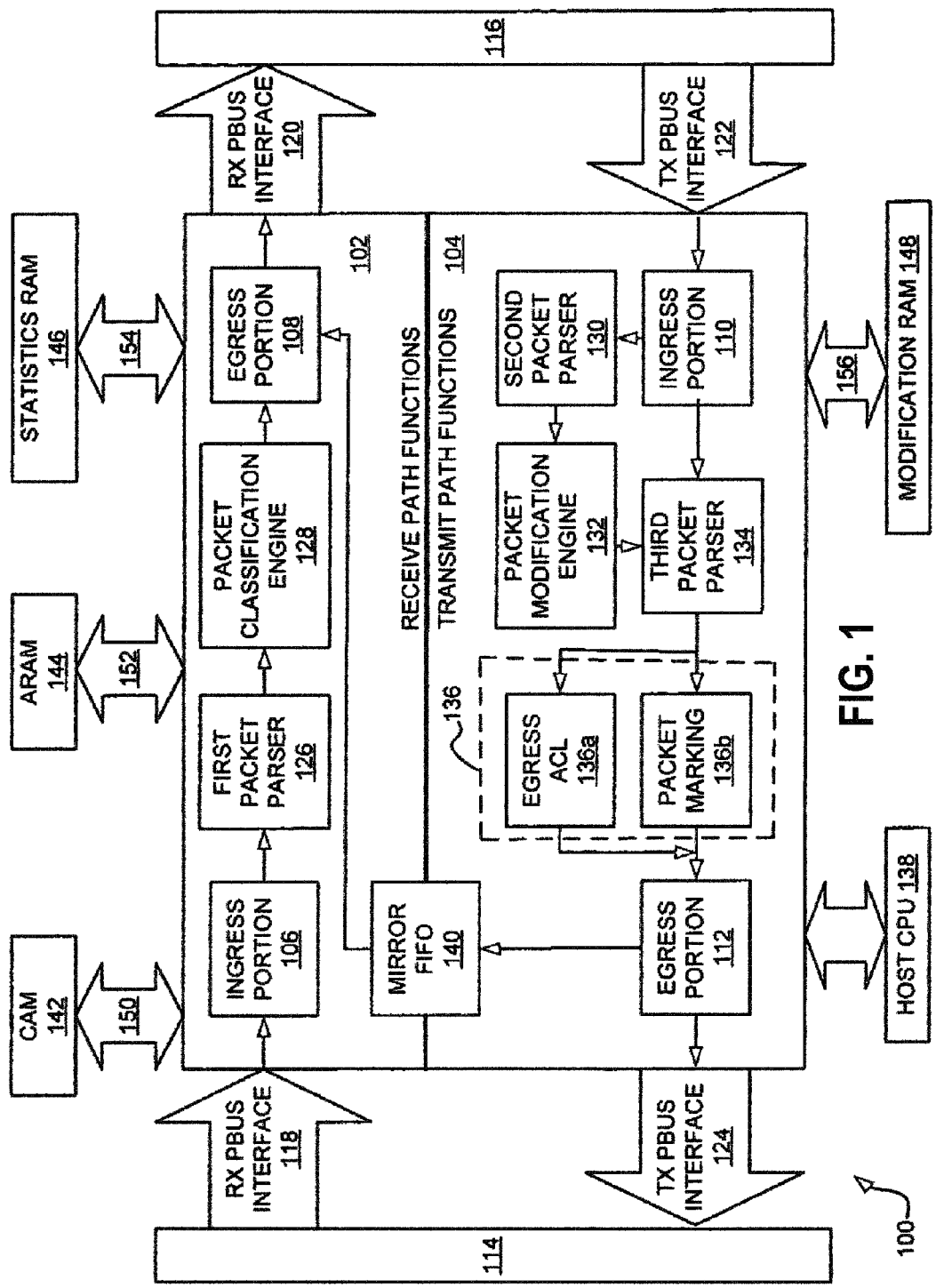
FIG. 1 is a block diagram of an embodiment of a packet processing system which comprises a receive-side packet classification system and a transmit-side packet modification system.

As utilized herein, terms such as "about" and "substantially" and "near" are intended to allow some leeway in mathematical exactness to account for tolerances that are acceptable in the trade. Accordingly, any deviations upward or downward from the value modified by the terms "about" or "substantially" or "near" in the range of 1% to 20% or less should be considered to be explicitly within the scope of the stated value.

As used herein, the terms "software" or "instructions" or commands" include source code, assembly language code, binary code, firmware, macro-instructions, micro-instructions, or the like, or any combination of two or more of the foregoing.

The term "memory" refers to any processor-readable physical or logical medium, including but not limited to RAM, ROM, EPROM, PROM, EEPROM, disk, floppy disk, hard disk, CD-ROM, DVD, queue, FIFO or the like, or any combination of two or more of the foregoing, on which may be stored one or more instructions or commands executable by a processor, data, or packets in whole or in part.

The terms "processor" or "CPU" or "engine" refer to any device capable of executing one or more commands or instructions and includes, without limitation, a general- or special-purpose microprocessor, finite state machine, controller, computer, digital signal processor (DSP), or the like.

The term "logic" refers to implementations in hardware, software, or combinations of hardware and software.

The term "stack" may he implemented through a first-in-first-out memory such as a FIFO.

The term "packet" means (1) a group of binary digits including data and control elements which is switched and transmitted as a composite whole, wherein the data and control elements and possibly error control information are arranged in a specified format; (2) a block of information that is transmitted within a single transfer operation; (3) a collection of symbols that contains addressing information and possibly error detection or correction information; (4) a sequence of characters with a specific order and format, such as destination followed by a payload; (5) a grouping of data of some finite size that is transmitted as a unit; (6) a frame; (7) the logical organization of control and data fields defined for any of the layers or sub-layers of an applicable reference model, including the OSI or TCP/IP reference models, e.g., MAC sub-layer; or (8) a unit of transmission for any of the layers or sub-layers of an applicable reference model, including the OSI or TCP/IP reference models.

The term "layer two of the OSI reference model" includes the MAC sub-layer.

The term "port" or "channel" refers to any point of ingress or egress to or from a switch or other entity, including any port channel or sub-channel, or any channel or sub-channel of a bus coupled to the port.

Example Environment

This section describes an example environment for the subject invention. Many other examples are possible, so nothing in this description should be taken as limiting.

FIG. 1 illustrates an embodiment 100 of a packet processing system comprising a packet classification system 102 and a packet modification system 104. The packet classification system 102 has an ingress portion 106 and an egress portion 108. Similarly, the packet modification system 104 has an ingress portion 110 and an egress portion 112. The ingress portion 106 of the packet classification system 102 is coupled, through interface 118, to one or more network-side devices 114, and the egress portion 108 of the packet classification system 102 is coupled, through interface 120, to one or more switch-side devices 116. The ingress portion 110 of the packet modification system 104 is coupled, through interface 122, to the one or more switch-side devices 116, and the egress portion 124 of the packet modification system 104 is coupled, through interface 112, to the one or more network-side devices 114.

The packet classification system 102 comprises an ingress portion 106, a first packet parser 126 for parsing a packet and providing first data representative thereof, and a packet classification engine 128 for classifying the packet responsive to the first data. The packet modification system 104 comprises a second packet parser 130 for parsing the classified packet (after a round trip through the one or more switch-side devices 116) or a packet derived there-from and providing second data representative thereof, a packet modification engine 132 for modifying some or all of the packet responsive to the second data, a third packet parser 134 for parsing the modified packet and providing third data representative thereof, and a packet post-processor 136 for post-processing the modified packet responsive to the third data.

In one embodiment, the packet undergoing processing by the system has a plurality of encapsulated layers, and each of the first, second and third parsers 126, 130, 134 is configured to parse the packet by providing context pointers pointing to the start of one or more of the encapsulated layers. In a second embodiment, the packet undergoing processing by the system comprises a first packet forming the payload portion of a second packet, each of the first and second packets having a plurality of encapsulated layers, and each of the first, second and third parsers 126, 130, 134 is configured to parse the packet by providing context pointers pointing to the start of one or more of the encapsulated layers of the first packet and one or more of the encapsulated layers of the second packet.

In one implementation, the packet post-processor 136 is configured to compute a checksum for a modified packet responsive to the third data provided by parser 134. In one embodiment, the packet post-processor 136 is configured to independently calculate a layer three (IP) and layer four (TCP/UDP) checksum.

In one embodiment, packet post-processor 136 comprises Egress Access Control List (ACL) logic 136a and Packet Marking logic 136b. The Egress ACL logic 136a is configured to arrive at an ACL decision with respect to a packet. In one implementation, four ACL decisions can be independently performed: 1) default ACL action; 2) CPU copy; 3)

mirror copy; and 4) kill. The default ACL action may be set to kill or allow. The CPU copy action forwards a copy of the packet to a host 138 coupled to the system. The mirror copy action implements an egress mirroring function (to be discussed in more detail later), in which a copy of the packet is forwarded to mirror FIFO 140 and then on to the egress portion 108 of the packet classification system 102. The kill action either kills the packet or marks it for killing by a downstream Medium Access Control (MAC) processor.

The Packet Marking logic 136*b* is configured to implement a packet egress marking function in which certain packet marking control information for a packet generated by the packet classification system 102 is used to selectively modify one or more quality of service (QoS) fields in the packet.

In one embodiment, Content Addressable Memory (CAM) 142 is used by the packet classification system 102 to perform packet searches to arrive at a classification decision for a packet. In one implementation, the CAM searches are ternary in that all entries of the CAM have a data and mask field allowing don't care setting of any bit position in the data field. In another implementation, the CAM searches are binary, or combinations of binary and ternary.

The associated RAM (ARAM) 144 provides associated data for each entry in the CAM 142. The ARAM 144 is accessed using the match address returned by the CAM 142 as a result of a search operation. The ARAM 144 entry data is used to supply intermediate classification information for the packet that is used by the classification engine 128 in making a final classification decision for the packet.

The statistics RAM 146 is used to maintain various packet statistics, including, for each CAM entry, the cumulative number and size of packets which hit or matched that entry.

The modification RAM 148 provides data and control structures for packet modification operations performed by the modification engine 132.

In one implementation, the interfaces 150, 152, 154, and 156 with any of the RAMs or CAMs may be a QDR- or DDR-type interface as described in U.S. patent application Ser. No. 10/655,742, filed Sep. 4, 2003, which is hereby fully incorporated by reference herein as though set forth in full.

FIG. 2 illustrates the format of classification data 200 for a packet as produced by one embodiment of packet classification system 102. The classification data 200 in this embodiment has first and second portions, identified respectively with numerals 202 and 204. The first portion 202 is a 64 bit Address Filtering Header (AFH) which is pre-pended to the packet. The second portion 204 is a 20 bit grouping of flags which are encoded as control bits maintained by the system 100.

In one embodiment, the Port Tag Index (PTI) field is an identifier of the port or list of ports within interface 118 over which the packet will be sent by the packet modification engine. (The assumption in this embodiment is that the interface 118 is a multi-port interface).

The Egress Quality of Service (EQoS) field may be used to perform an egress queue selection function in a device encountering the packet. In one embodiment, this field also encodes one of the following functions: nothing, pre-emptive kill, normal kill, thermonuclear kill, egress mirror copy, pre-emptive intercept to host, and normal intercept to host.

The Link Aggregation Index (LAI) field may be used to implement physical link selection, ingress alias, echo kill alias, or equal cost multi-path functions in a device encountering the packet.

The JUMBO flag, if asserted, directs a device encountering the packet to perform a JUMBO-allowed check. In one embodiment, the flag is used to implement the policy that the only valid JUMBO packets are IP packets. Therefore, if the packet is a non-IP JUMBO packet, the device either sends it to a host, fragments it, or kills it.

The DON'T FRAG flag, if asserted, directs a device encountering the packet not to fragment it in the course of implementing a JUMBO-allowed check.

The IF TYPE flag indicates whether the ingress interface over which the packet was received is an Ethernet or Packet Over Sonet (POS) interface.

The ROUTE flag, if asserted, indicates that the packet is being bridged not routed, and may be used by devices encountering the packet to implement an echo kill suppress function.

The RANDOM EARLY DROP (RED) flag may be used to implement a random early drop function in devices encountering the packet.

The CTL flag indicates the format of the AFH. FIG. 2 illustrates the format of the header for packets exiting the packet classification system 102 and destined for the one or more switch-side devices 116. Another format applies for packets exiting the one or more switch-side devices 116 and destined for the packet modification system 104. The CTL flag indicates which of these two formats is applicable.

The Transmit Modification Index (TXMI) field is used by the modification engine 132 to retrieve control and data structures from Modification RAM 148 for use in performing any necessary modifications to the packet.

The CPU Quality of Service (CQoS) field may be used to perform an ingress queue select function in a host coupled to the packet processing system.

In one embodiment, the CPU Copy flag, if asserted, directs one or more of the switch-side devices 116 to forward a copy of the packet to a host coupled to the packet processing system. In another embodiment, the CPU Copy flag, if asserted, directs a copy of a packet to be forwarded to the host through a host bus or another PBUS.

The Redirect flag, if asserted, directs one or more of the switch-side devices 116 to forward a copy of the packet to the host for redirect processing. In redirect processing, the host receives the packet copy and redirects it to the sender, with an indication that the sender should switch the packet, not route it.

The Statistical Sample (SSAMPLE) flag, if asserted, indicates to one or more of the switch-side devices 116 that the packet is a candidate for statistical sampling. If the packet is ultimately selected for statistical sampling, a copy of the packet is directed to the host, which performs a statistical analysis of the packet for the purpose of accurately characterizing the network traffic of which the packet is a part.

The LEARN flag, if asserted, directs one or more of the switch-side devices 116 to forward a copy of the packet to the host so the host can perform learn processing. In learn processing, the host analyzes the packet to "learn" the sender's MAC address for future packet switching of packets to that address.

The Egress Mirror (EMIRROR) flag, if asserted, implements egress mirroring by directing one or more of the switch-side devices 116 to send a copy of the packet to mirror FIFO 140. From mirror FIFO 140, the packet passes through the egress portion 108 of the packet classification system 102 en route to the one or more switch-side devices 116.

The Ingress Quality of Service (IQoS) field may be used to perform an ingress queue selection function in a device encountering the packet.

The Egress Mark Select (EMRK SEL) field selects one of several possible egress mark functions. The Egress Mask (EMRK MASK) field selects one of several possible egress masks. Together, the EMRK SEL and EMRK MASK fields forms an embodiment of packet egress marking control information which may be used by packet marking logic 136b to mark the packet, i.e., selectively modify one or more QoS fields within the packet.

The Ingress Mirror (IMIRROR) flag, if asserted, directs one or more of the switch-side devices 116 to forward a copy of the packet to the designated ingress mirror port on the switch.

The Parity Error Kill (PERR KILL) flag, if asserted, directs the interface 120 to kill the packet due to detection of an ARAM parity error.

In one embodiment, the EMIRROR bit is normally in an unasserted state. If the packet classification system 102, after analyzing the packet, determines that egress mirroring of the packet is appropriate, the packet classification system 102 changes the state of the EMIRROR bit to place it in the asserted state.

The packet, along with a pre-pended AFH containing the EMIRROR bit, is then forwarded to the one or more switch-side devices 116. After processing the packet, the one or more devices transmit the packet, with the EMIRROR bit preserved in a pre-pended packet header, back to the packet modification system 104 over interface 122. In response, the packet modification system 104 is configured to detect the state of the EMIRROR bit to determine if egress mirroring of the modified packet is activated, and if so, provide a copy of the modified packet to the egress portion 108 of the packet classification system 102 through the mirror FIFO 140.

In one embodiment, the EQoS, CQoS, IQoS, EMRK SEL and EMRK MASK fields define a multi-dimensional quality of service indicator for the packet. In this embodiment, the EMRK SEL and EMRK MASK fields form packet egress marking control information which is utilized by packet modification system 104 to selectively modify one or more quality of service fields within the packet, or a packet derived there-from.

The quality of service indicator for a packet may be derived from a plurality of candidate quality of service indicators derived from diverse sources. In one embodiment, a plurality of candidate quality of service indicators are derived for a packet, each with an assigned priority, and a configurable priority resolution scheme is utilized to select one of the plurality of quality of service indicators for assigning to the packet. In one embodiment, one or more of the candidate quality of service indicators, and associated priorities, are derived by mapping one or more fields of the packet into one or more candidate quality of service indicators for the packet and associated priorities. In a second embodiment, one or more searches are conducted to obtain one or more candidate quality of service indicators for the packet and associated priorities. In a third embodiment, a combination of these two approaches is utilized.

In one example, candidate quality of service indicators, and associated priorities, are derived from three sources. The first is a VLAN mapping scheme in which a VLAN from the packet is mapped into a candidate quality of service indicator and associated priority using a VLAN state table (VST). The VLAN from the packet may represent a subnet or traffic type, and the associated priority may vary based on the subnet or traffic type. The second is a CAM-based search which yields an associated ARAM entry which in turn yields a candidate quality of service indicator. A field of an entry in a Sequence Control Table (SCT) RAM, which provides the sequence of commands controlling the operation of one embodiment of the packet classification engine 102, provides the associated priority. The third is a QoS mapping scheme, which operates in one of three modes, as determined by a field in a SCT RAM entry.

In the first mode, the .1p mapping mode, the VST provides the four QSEGment bits. The QSEG and the .1p bits are mapped into a candidate quality of service indicator, and the VLAN itself is mapped into an associated priority using the VST. In the second mode, the MPLS mapping mode, the EXP/QOS fields from the packet are mapped into a candidate quality of service indicator, and a VLAN from the packet is mapped into the associated priority using the VST. In the third mode, the ToS mapping mode, the IPv4ToS, IPv6 Traffic Class, or Ipv6 Flow Label based QoS fields are mapped into a candidate quality of service indicator, and a VLAN from the packet is mapped into an associated priority using the VST.

In this example, the candidate quality of service indicator with the highest priority is assigned to the packet. Moreover, a candidate from one of the sources can be established as the default, which may be overridden by a candidate obtained from one of the other sources, at least a candidate which has a higher priority than the default selection. For example, the candidate quality of service indicator resulting from the .1p mapping mode can be established as the default selection, and this default overridden only by a candidate quality of service indicator resulting from an ARAM entry in turn resulting from a CAM-based search.

FIG. 3 illustrates an embodiment 300 of a packet classification system. In this embodiment, the packet classification system is coupled to one or more network-side devices through a multi-port packet bus (PBUS) 302, as described in U.S. patent application Ser. Nos. 10/405,960 and 10/405,961, filed Apr. 1, 2003, which are both hereby fully incorporated herein by reference. PBUS ingress logic 304 is configured to detect a start of packet (SOP) condition for packets arriving at the packet classification system over the PBUS.

Upon or after detection of the SOP condition, the packet, or a portion thereof, is stored in slicer 306. Slicer 306 is configured to slice some or all of a packet into portions and provide the portions in parallel over first data path 308 having a first width to classification engine 310. In one embodiment, the slicer 306 is a FIFO which stores the first 128 bytes of a packet (or the entirety of the packet if less than 128 bytes), and provides the 1024 bits thereof in parallel to the packet classification engine 310 over the first data path 308.

Upon or after detection of the SOP condition, parser 312 parses the packet in the manner described previously, and stores the resultant context pointers (and other flags resulting from the parsing process) in parser result RAM 314. Concurrently with this parsing process, the packet is stored in buffer 318, which in one embodiment, is a FIFO buffer.

The packet classification engine 310 is configured to classify the packet responsive to the packet portions received over the first data path 308 and the parser results as stored in the parser result RAM 314, and store data representative of the packet classification in classification RAM 316. In one embodiment, the classification data is the AF header illustrated in FIG. 2.

An associator 320 is configured to associate the data representative of the packet classification with some or all of the packet, and provide the associated packet over a second data path 322 having a second width less than the first width.

The packet classification system is coupled to one or more switch-side devices over a multi-port PBUS 326, and PBUS egress logic 324 is configured to transmit the associated packet over the PBUS 326.

In one embodiment, slicer 306 comprises a plurality of memories configured to store some or all of the packet, and provide the portions thereof in parallel over the first data path 308 to the classification engine 310. In one example, the slicer 306 is configured as eight (8) memories configured to provide the first 1024 bits of the bits of the packet (or less if the packet is less than 128 bytes) in parallel over the first data path 308 to classification engine 310.

In one embodiment, the associator 320 comprises a multiplexor configured to multiplex onto the second data path 322 the data representative of the packet classification as stored in classification RAM 316 and some or all of the packet as stored in buffer 318. In one implementation, the multiplexor multiplexes the first 8 byte portion 202 of the AF data illustrated in FIG. 2 (which may be referred to as the AF header) onto the second data path followed by the packet as stored in buffer 318, thereby effectively pre-pending the AF header to the packet. In this implementation, control logic 328 controls the operation of the multiplexor through one or more signals provided over control data path 334.

More specifically, the multiplexor in this implementation is configured to select one of three inputs and output the selected input to the second data path 322 under the control of the control logic 328. The first input is the classification data as stored in classification RAM 316. The second input is the packet as stored in buffer 318. The third input is the output of the mirror FIFO 140. This third input is selected when the egress mirroring function, discussed previously, is activated.

In one embodiment, the control logic 328 is also configured to maintain first and second FIFO buffers, identified respectively with numerals 330 and 332, the first FIFO buffer 330 for identifying those packets which are awaiting classification by the packet classification system, and the second FIFO buffer 332 for identifying those packets which are undergoing classification by the classification system.

In this embodiment, the control logic 328 is configured to place an identifier of a packet on the first FIFO buffer 330 upon or after receipt of the packet by the packet classification system, pop the identifier off the first FIFO buffer 330 and place it on the second FIFO buffer 332 upon or after initiation of classification processing of the packet by the packet classification system, and pop the identifier off the second FIFO buffer 332 upon or after completion of classification processing of the packet by the packet classification system.

The control logic 328 is configured to prevent the packet classification system from outputting a packet onto PBUS 326 while an identifier of the same is placed on either the first or second FIFO buffers 330, 332, and allows the packet classification system to output the packet onto PBUS 326 upon or after the identifier of the packet has been popped off the second FIFO buffer 332. In one implementation, the control logic 328 prevents the associator 320 from outputting data on the second data path 322 through one or more signals provided over control data path 334. In one implementation, the control logic 328 is a state machine.

In one embodiment, the control logic 328 forms the basis of a packet statistics maintaining system within the packet classification system. In this embodiment, the control logic 328 is configured to maintain a pool of packet size determiners, and allocate a packet size determiner to a packet from the pool upon or after receipt thereof by the packet classification system.

In one implementation, the control logic 328 allocates a packet size determiner to a packet upon or after the PBUS ingress logic 304 signals a SOP condition for the packet. The packet size determiner is configured to determine the size of the packet, and the control logic 328 is configured to return the packet size determiner to the pool upon or after the same has determined the size of the packet. In one implementation example, the packet size determiners are counters.

Statistics RAM 330 in this embodiment maintains packet statistics, and statistics update logic 336 is configured to update the packet statistics responsive to the determined size of the packet. In one implementation, the statistics update logic 336 includes a queue for queuing statistics update requests issued by the control logic 328.

In one configuration, the packet statistics maintaining system is configured to maintain packet statistics indicating the cumulative size of packets which have met specified processing conditions or hits, and the statistics update logic 336, upon or after a packet size determiner has determined the size of a packet, is configured to increment a cumulative size statistic for a particular processing condition or hit by the determined size of the packet if the packet satisfies that particular processing condition or hit. In one example, the system maintains statistics indicating the cumulative size and number of packets which have resulted in each of a plurality of ternary CAM 142 hits.

Figure 4A:
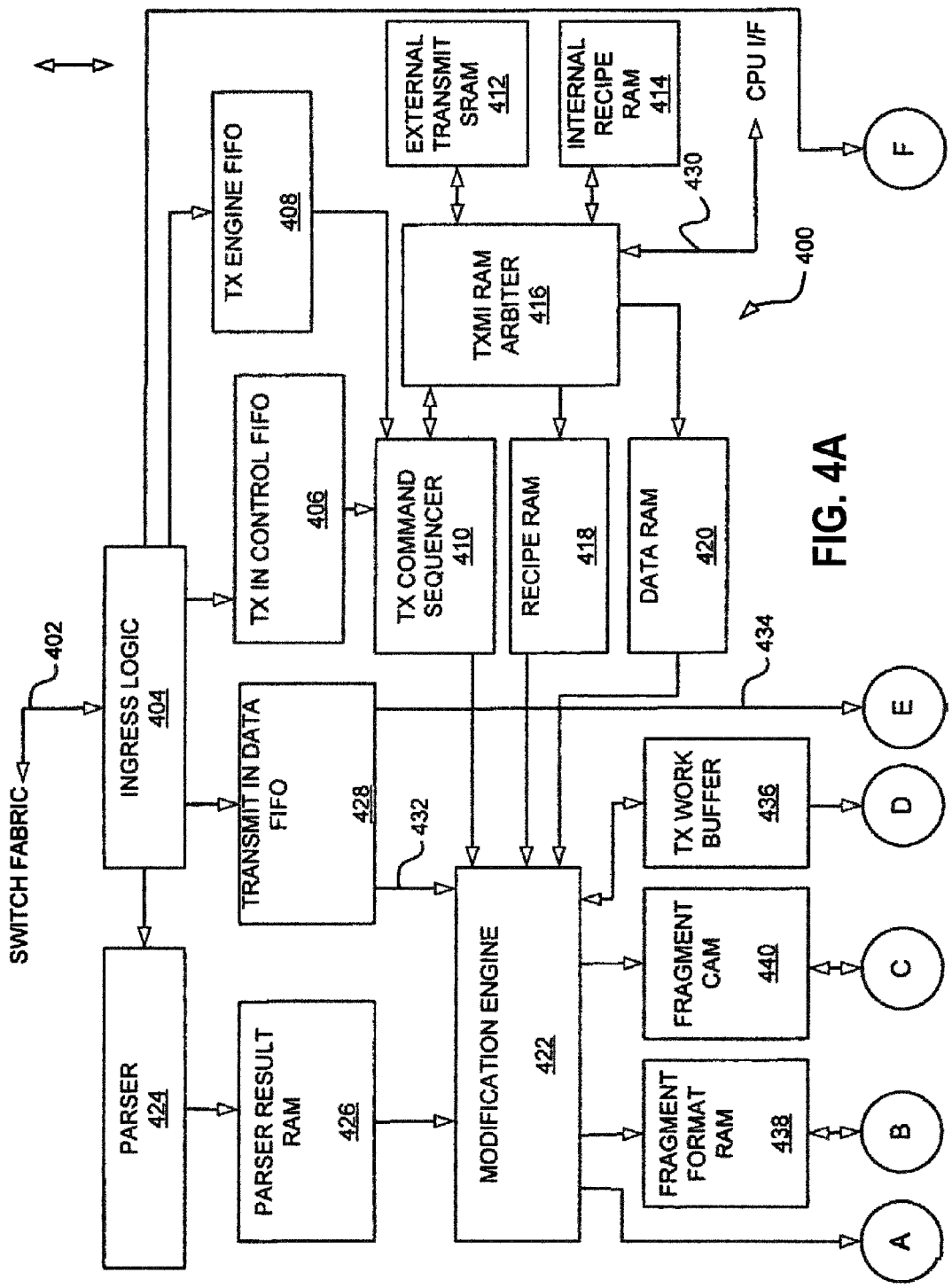
FIGS. 4A-4B is a block diagram of an embodiment of a transmit-side packet modification system.
Figure 4B:
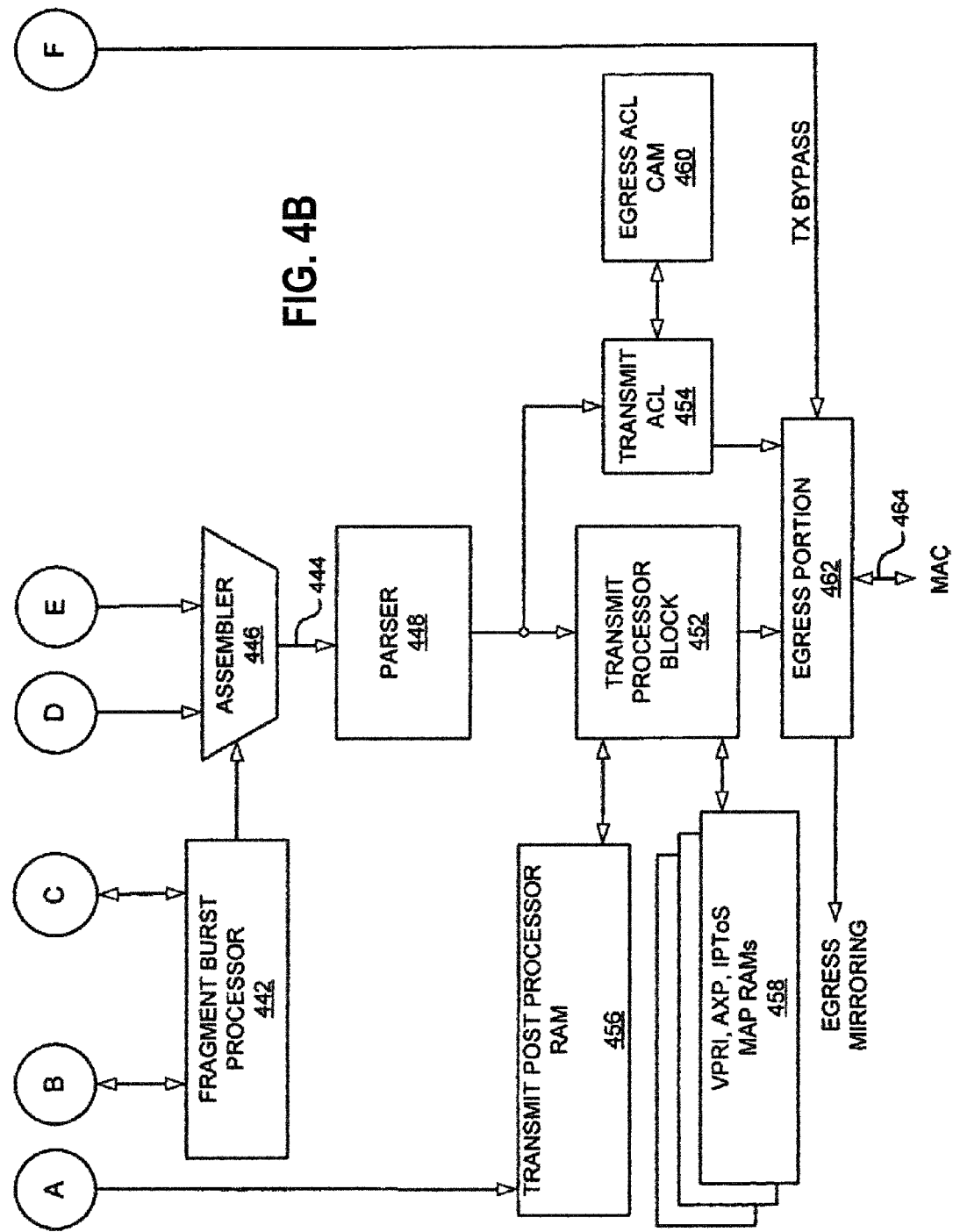

FIGS. 4A-4B illustrate an embodiment 400 of a packet modification system having PBUS ingress logic 404 which is coupled to one or more switch-side devices through PBUS 402. In this embodiment, the packets are received over the PBUS channels in bursts. The PBUS ingress logic 404 is configured to monitor the PBUS channels in a round robin fashion. When the PBUS ingress logic 404 detects a SOP condition on one of the channels, the Transmit Modification Index (TXMI) is extracted from the AF header of the packet, and it, along with the length of the initial packet burst, and an end of packet (EOP) marker if the packet length is less than or equal to the burst length, is placed on Transmit In Control FIFO 406. The packet or packet burst is stored in Transmit In Data FIFO 428, and a pointer to the start of the packet or packet burst (SOP pointer) is stored in Transmit Engine FIFO 408, along with an identifier of the PBUS channel over which the packet or packet burst was received. In one implementation, the packet bursts are 128 bytes in length.

Transmit In Data FIFO 428 stores the packet data such that portions of the packet can be passed in parallel over a first data path 402 having a first width to a modification engine 422. In one implementation, the Transmit In Data FIFO 428 comprises a plurality of FIFOs, with the outputs of the FIFOs coupled in parallel to the modification engine 422 and collectively forming the first data path 402. Incoming packet or packet bursts are copied into each of the plurality of FIFOs, thereby providing the modification engine with sliced portions of the packets or packet bursts in parallel.

The incoming packets or packet bursts are also input to the second packet parser 424, which parses the packets or packet bursts in the manner described previously. The context pointers and status bits resulting from the parsing process are stored in parser result RAM 426.

The Transmit Command Sequencer 410 is configured to read a SOP pointer and channel from the Transmit Engine FIFO 408, and utilize this information to locate the packet or packet bursts in the Transmit In Control FIFO 406. The Transmit Modification Index (TXMI) within the AF header of this packet or packet burst is then located and used to access a TXMI link in External Transmit SRAM 412, an SRAM located off-chip in relation to modification engine 422. The TXMI link may either be 1) an internal recipe link to a recipe of modification commands stored in Internal Recipe RAM 414, an on-chip RAM in relation to modification engine 422, and related data structures stored in External Transmit SRAM 412, or 2) an external recipe link to a recipe of modification commands stored in External Transmit SRAM 412 and related data structures also stored in External Transmit SRAM 412.

The sequencer 410 also assigns a sequence number to the packet to prevent packet re-ordering. It then directs the Transmit RAM arbiter 416 to read the recipe of modification commands stored in the External Transmit SRAM 412 (assuming the TXMI link is an external recipe link) or Internal Recipe RAM 414 (assuming the TXMI link is an internal recipe link) and store the same in Recipe RAM 418, an on-chip RAM in relation to modification engine 422. It further directs the arbiter 416 to read the data structures associated with the specified internal or external recipe command sequence, and store the same in Data RAM 420, another on-chip RAM in relation to modification engine 422.

The sequencer 410 then awaits an available slot in the pipeline of the modification engine 422. When such is available, the sequencer 410 passes to the engine 422 for placement in the slot a pointer to the recipe as stored in Recipe RAM 418 and other related information.

The sequencer 410 assigns a fragment buffer to the packet. The fragment buffer is a buffer within a plurality of fragment buffers which collectively may be referred to as TX work buffer 436. The modification engine then executes the recipe for the packet or packet burst, through one or more passes through the modification engine pipeline. In one embodiment, the recipe comprises one or more entries, and one or more passes through the pipeline are performed to execute each entry of the recipe.

In the process of executing the recipe, the modification engine 422 stores the modified fragments of the packet in the fragment buffer allocated to the packet in TX work buffer 436. At the same time, the modification engine 422 stores, in ascending order in fragment format RAM 438, pointers to the modified fragments of the packet as stored in the fragment buffer and pointers to the unmodified fragments of the packet as stored in Transmit In Data FIFO 428.

When all the recipe entries have been executed, the modification engine 422 writes an entry to the fragment CAM 440, the entry comprising the PBUS channel over which the packet was received, the sequence number for the packet, the SOP pointer to the packet (as stored in the Transmit In Data FIFO 428), a packet to be killed flag, a packet offset in the Transmit In Data FIFO 428, and the total length of the list of fragments as stored in the fragment format RAM 438. This completes the processing of the packet by the modification engine 422.

Fragment/burst processor 442 assembles the packets for ultimate egress from the system. To prevent packet re-ordering, the fragment/burst processor 442 processes, for each PBUS channel, the packets in the order in which they were received by the modification system 400. More specifically, the fragment/burst processor 442 maintains an expected next sequence number for each PBUS channel, and then performs, in round robin fashion, CAM searches in fragment CAM 440 for an entry bearing the expected next sequence number for the channel. IF an entry is found with that sequence number, the fragment/burst processor 442 processes it. If such an entry is not found, the fragment/burst processor 442 takes no action with respect to the channel at that time, and proceeds to process the next channel.

When a fragment CAM entry with the expected next sequence number is located, the fragment/burst processor 442 directs assembler 446 to assemble the packet responsive to the fragment list for the packet as stored in the fragment format RAM 438. In one embodiment, the assembler 446 is a multiplexor, which is directed to multiplex between outputting on second data path 444, responsive to the fragment list, the modified packet fragments as stored in the TX work buffer 436 and the unmodified packet fragments as stored in the Transmit In Data FIFO 428 (as provided to the multiplexor 446 over data path 434). Through this process, the packet is assembled in ascending order on second data path 444. In one embodiment, the second data path 444 has a width less than the width of the first data path 402. In one implementation, the fragment/burst processor 442 outputs the packets over data path 444 in the form of bursts.

The assembled packet is parsed by the third packet parser 448 in the manner described previously. The resultant context pointers and status flags are then passed, along with the packet, for concurrent processing by Transmit Processor Block 452 and Transmit ACL Logic 454.

The Transmit Processor Block 452 performs two main functions. First, it performs egress mark processing by selectively modifying one or more QoS fields in the packet responsive to the egress mark control information from the packet stored by the modification engine in Transmit Post Processor RAM 456. In one example, any of the VLAN VPRI, MPLS EXP, and IPv4/IPv6 TOS fields may be modified through this process utilizing the VPRI/EXP/IPToS RAMs 458 as appropriate. The egress mark control information may be derived from one or more egress mark commands specified by an AFH pre-pended to the packet, or from one or more egress mark commands within a recipe for the packet. Second, it performs OSI Layer 3/Layer 4 checksum calculation or modification.

The Transmit ACL logic 454 conducts a CAM search for the packet in Egress ACL CAM 460 to determine if the packet should be killed, a copy sent to the host, or mirrored to the egress mirror FIFO 140. The packet then exits the packet modification system 400 through the egress portion 462 of the system 400, and is output onto PBUS 464.

Figure 5:
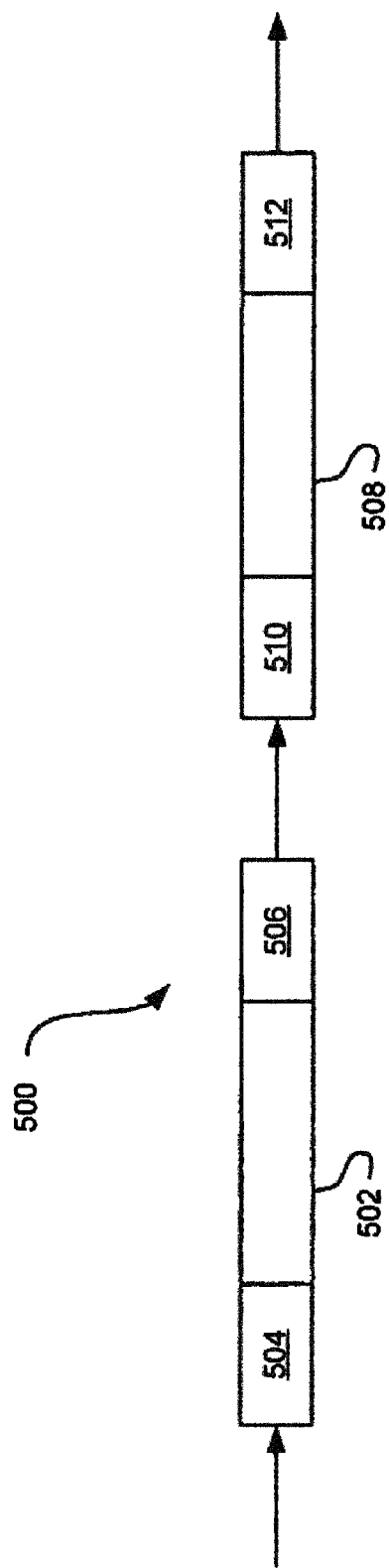
FIG. 5 is a block diagram of an embodiment of a cascade of multiple packet processing systems.

FIG. 5 illustrates a cascaded combination 500 of multiple, replicated packet systems, each of which is either a packet classification system or a packet modification system. In one embodiment, the cascaded combination comprises a first one 502 of the replicated packet systems having ingress and egress portions, identified respectively with numerals 504 and 506, and a second one 508 of the replicated packet systems having ingress and egress portions, identified respectively with numerals 510 and 512.

In this embodiment, the egress portion 506 of the first packet system 502 is coupled to the ingress portion 510 of the second packet system 508. Moreover, the first one 502 of the replicated packet systems is configured to perform partial processing of a packet, either classification or modification processing as the case may be, and the second one 508 of the replicated packet systems is configured to complete processing of the packet.

In one configuration, packet system 508 forms the last one of a plurality of systems in the cascaded combination, and packet system 502 forms either the first or the next to last one of the systems in the cascaded combination.

In one example, each of the replicated systems performs a limited number of processing cycles, and the number of replicated systems is chosen to increase the number of processing cycles to a desired level beyond that achievable with a single system.

In a second example, a complete set of processing functions or tasks is allocated amongst the replicated systems. In one configuration, a first replicated system is allocated ACL and QoS classification processing tasks, and a second replicated system is allocated PTI/TXMI classification processing tasks.

Figure 6:
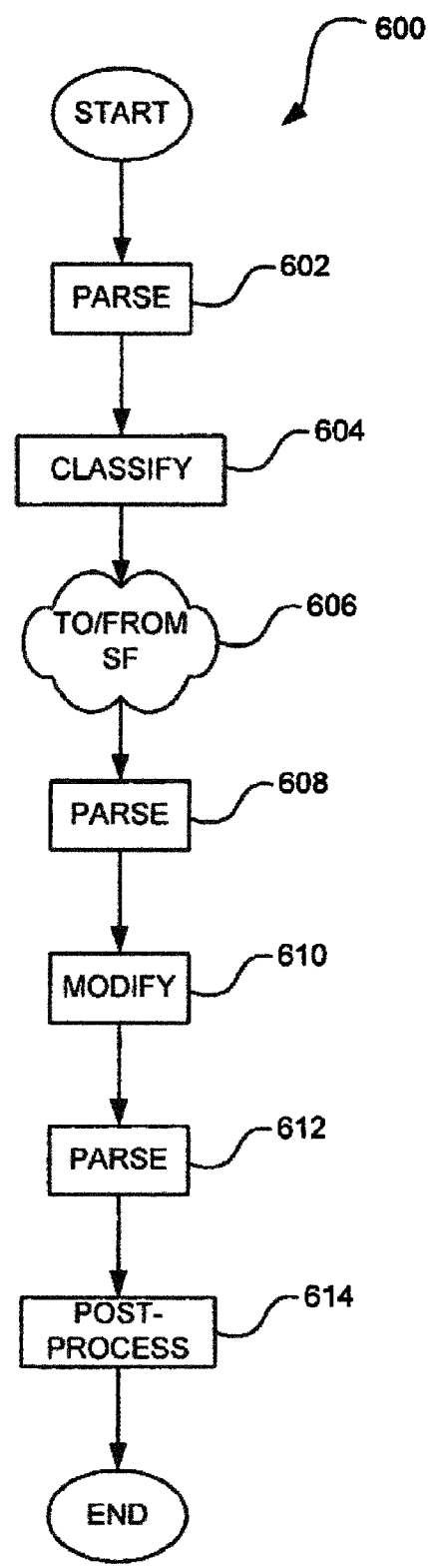
FIG. 6 is a flowchart of an embodiment of method of processing a packet which comprises multiple parsing steps.

FIG. 6 is a flowchart of one embodiment 600 of a method of processing a packet. In this embodiment, the method comprises step 602, parsing a packet and providing first data representative thereof, and step 604, classifying the packet responsive to the first data.

In step 606, the packet is forwarded to and received from switching fabric, which may perform additional processing of the packet. Step 608 comprises parsing the packet received from the switching fabric (which may be the packet forwarded to the switching fabric, or a packet derived therefrom), and providing second data representative thereof.

Step 610 comprises modifying the packet responsive to the second data, and step 612 comprises parsing the modified packet and providing third data representative thereof. Step 614 comprises post-processing the modified packet responsive to the third data.

In one embodiment, the packet undergoing processing has a plurality of encapsulation layers, and each of the first, second and third parsing steps 602, 608, 612 comprising providing context pointers pointing to the start of one or more of the encapsulated layers of the packet.

In a second embodiment, the packet undergoing processing comprises a first packet forming the payload portion of a second packet, each of the first and second packets having a plurality of encapsulation layers, and each of the first, second and third parsing steps 602, 608, 612 comprises providing context pointers pointing to the start of one or more of the encapsulated layers of the first packet and one or more of the encapsulated layers of the second packet.

In one implementation, the post-processing step comprises computing a checksum for the modified packet. In a second implementation, the post-processing step comprises egress marking of the packet. In a third implementation, the post-processing step comprises the combination of the foregoing two implementations.

Figure 7:
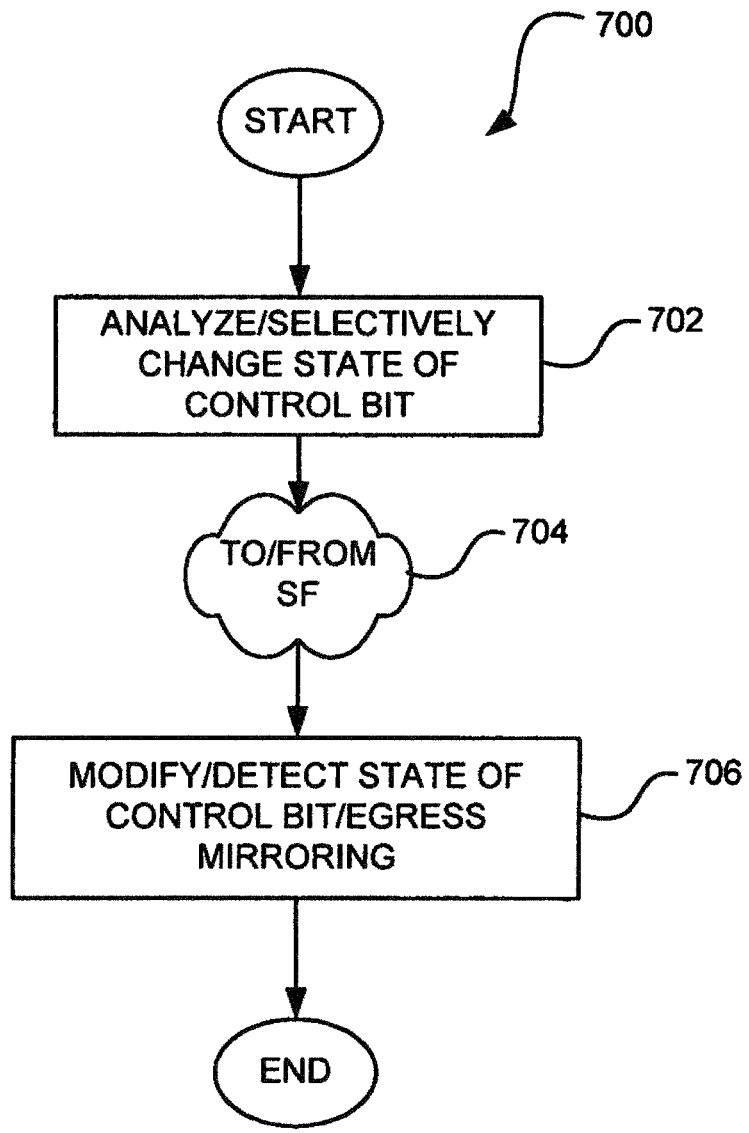
FIG. 7 is a flowchart of an embodiment of a method of performing egress mirroring of a packet.

FIG. 7 is a flowchart of a second embodiment 700 of a method of processing a packet. In this embodiment, step 702 comprises analyzing a packet in a packet classification system and, responsive thereto, selectively changing the state of a control bit from a first state to a second state. Step 704 comprises forwarding the packet to and from switching fabric. Step 706 comprises modifying, in a packet modification system, the packet received from the switching fabric (either the packet forwarded to the switching fabric, or a packet derived there-from), detecting the control bit to determine if egress mirroring of the modified packet is activated, and if so, providing a copy of the modified packet to the packet classification system.

In one implementation, the control bit is associated with the packet received from the switching fabric. In one example, the control bit is in a packet header pre-pended to the packet received from the switching fabric.

Figure 8:
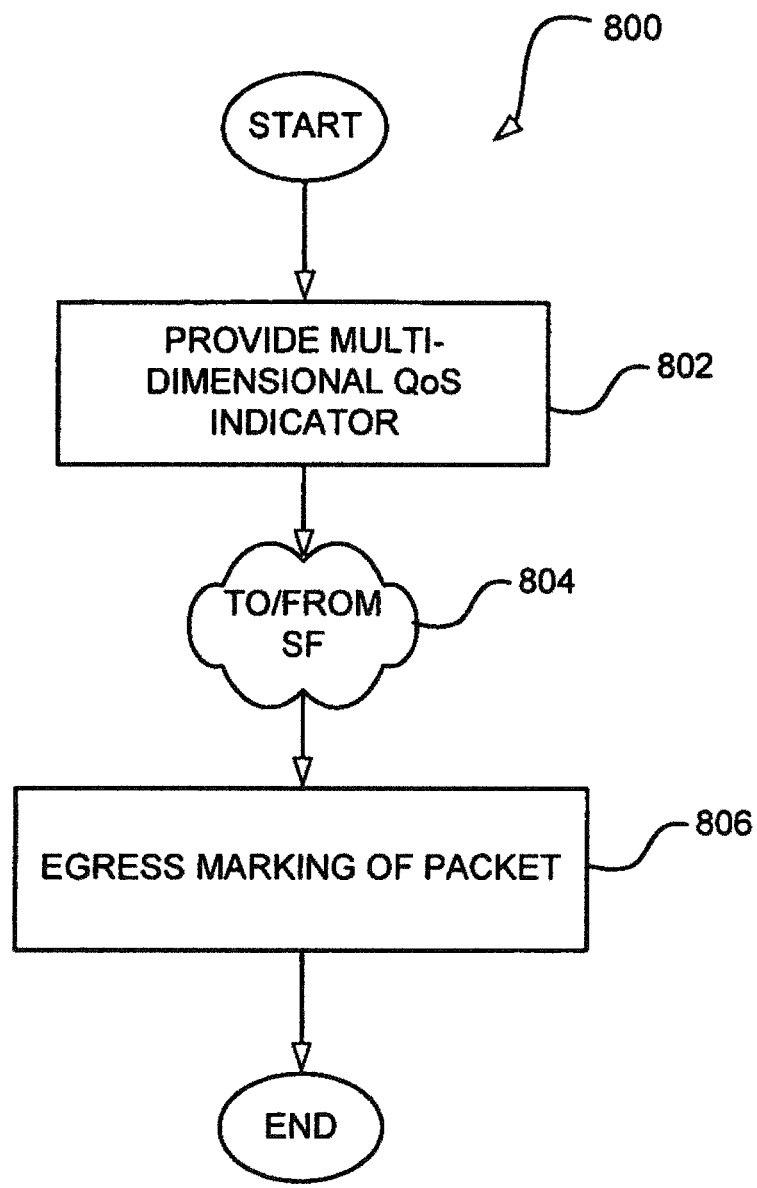
FIG. 8 is a flowchart of an embodiment of a method of performing egress marking of a packet.

FIG. 8 is a flowchart of a third embodiment 800 of a method of processing a packet. Step 802 comprises providing a multi-dimensional quality of service (QoS) indicator for a packet. Step 804 comprises forwarding the packet to and from switching fabric. Step 806 comprises egress marking of the packet received from the switching fabric (either the packet forwarded to the switching fabric, or a packet derived there-from), responsive to at least a portion of the multi-dimensional QoS indicator.

In one implementation, step 806 comprises selectively modifying one or more quality of service fields within the packet received from the switching fabric responsive to at least a portion of the multi-dimensional quality of service indicator.

In one configuration, the multi-dimensional quality of service indicator comprises an ingress quality of service indicator, an egress quality of service indicator, and packet marking control information, and step 806 comprises selectively modifying one or more quality of service fields within the packet received from the switching fabric responsive to the packet marking control information. In one example, the multi-dimensional quality of service indicator further comprises a host quality of service indicator.

In one embodiment, the method further comprises utilizing the ingress quality of service indicator as an ingress queue select. In a second embodiment, the method further comprises utilizing the egress quality of service indicator as an egress queue select. In a third embodiment, the method further comprises utilizing the host quality of service indicator as an ingress queue select for a host.

Figure 9:
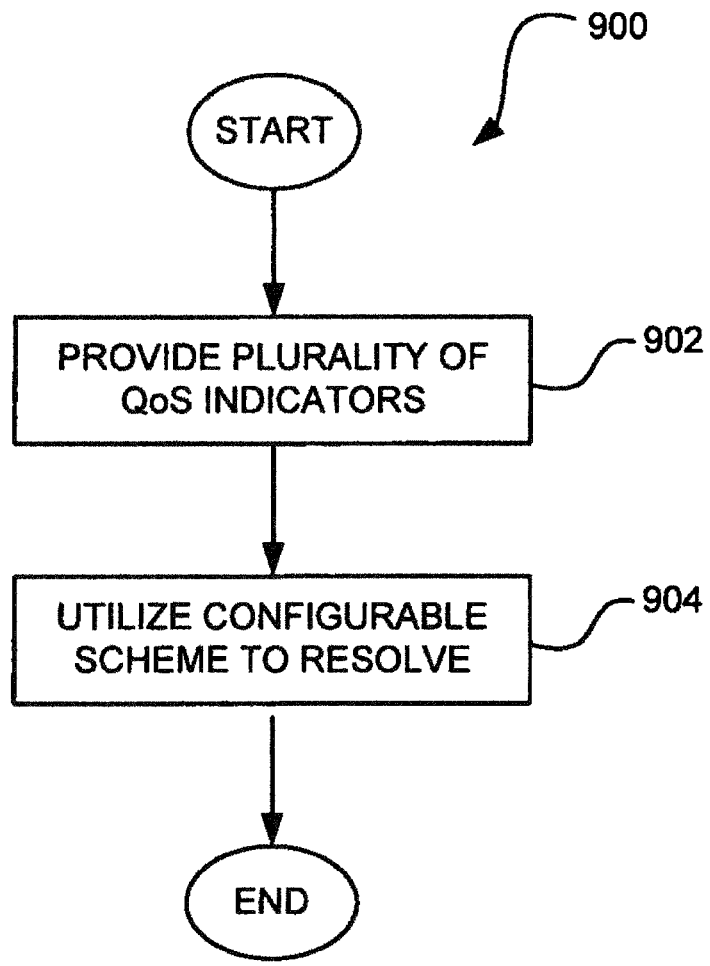
FIG. 9 is a flowchart of an embodiment of a method of resolving a plurality of quality of service (QoS) indicators for a packet utilizing a configurable priority resolution scheme.

FIG. 9 is a flowchart of an embodiment 900 of assigning a quality of service indicator to a packet. In this embodiment, step 902 comprises providing a plurality of quality of service indicators for a packet, each with an assigned priority, and step 904 comprises utilizing a configurable priority resolution scheme to select one of the plurality of quality of service indicators for assigning to the packet.

In one implementation, step 902 comprises mapping one or more fields of the packet into a quality of service indicator for the packet and an associated priority. In a second implementation, step 902 comprises performing a search to obtain a quality of service indicator for the packet and an associated priority. A third implementation comprises a combination of the foregoing two implementations.

Figure 10:
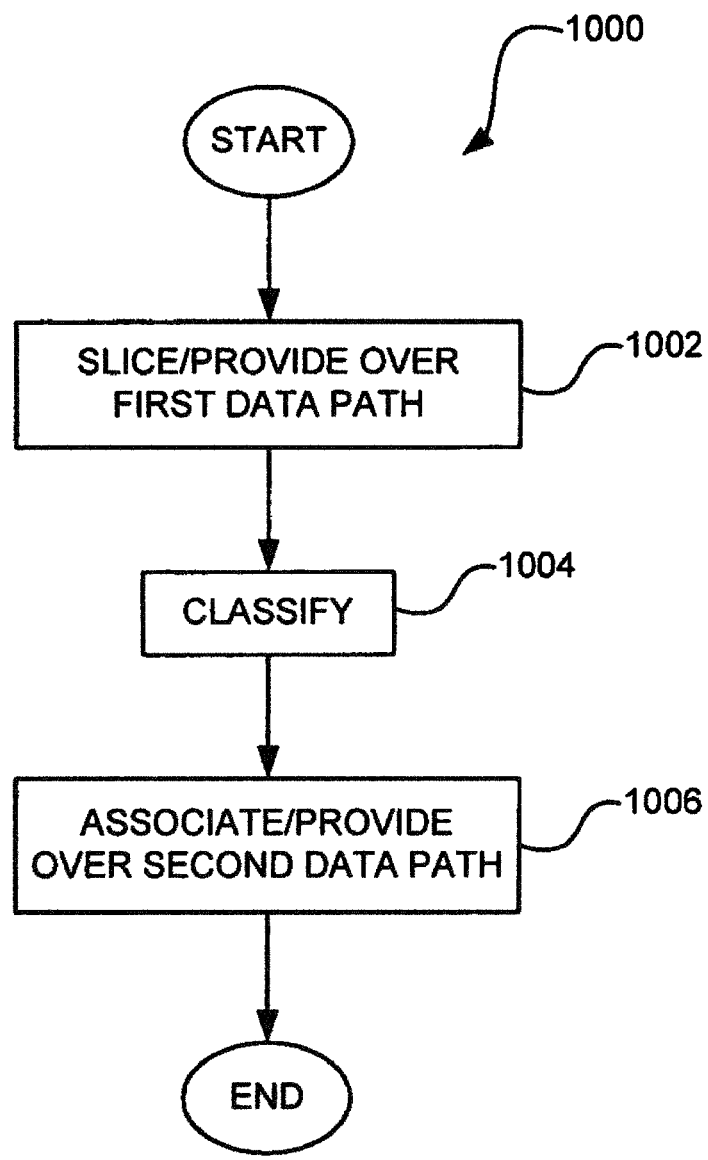
FIG. 10 is a flowchart of an embodiment of a method of classifying a packet in which sliced packet data is provided to a packet classification engine over a wide data path.

FIG. 10 is a flowchart of an embodiment 1000 of a method of classifying a packet. In this embodiment, step 1002 comprises slicing some or all of a packet into portions and providing the portions in parallel over a first data path having a first width to a classification engine. Step 1004 comprises classifying, in the packet classification engine, the packet responsive to the packet portions received over the first data path and providing data representative of the packet classification. Step 1006 comprises associating the data representative of the packet classification with the packet to form an associated packet, and providing the associated packet over a second data path having a second width less than the first width.

In one implementation, the step of providing the packet portions over the first data path comprises providing each of the bits of some or all of the packet in parallel over the first data path to the classification engine.

In a second implementation, the associating step comprises multiplexing the data representative of the packet classification and some or all of the packet onto the second data path.

Figure 11:
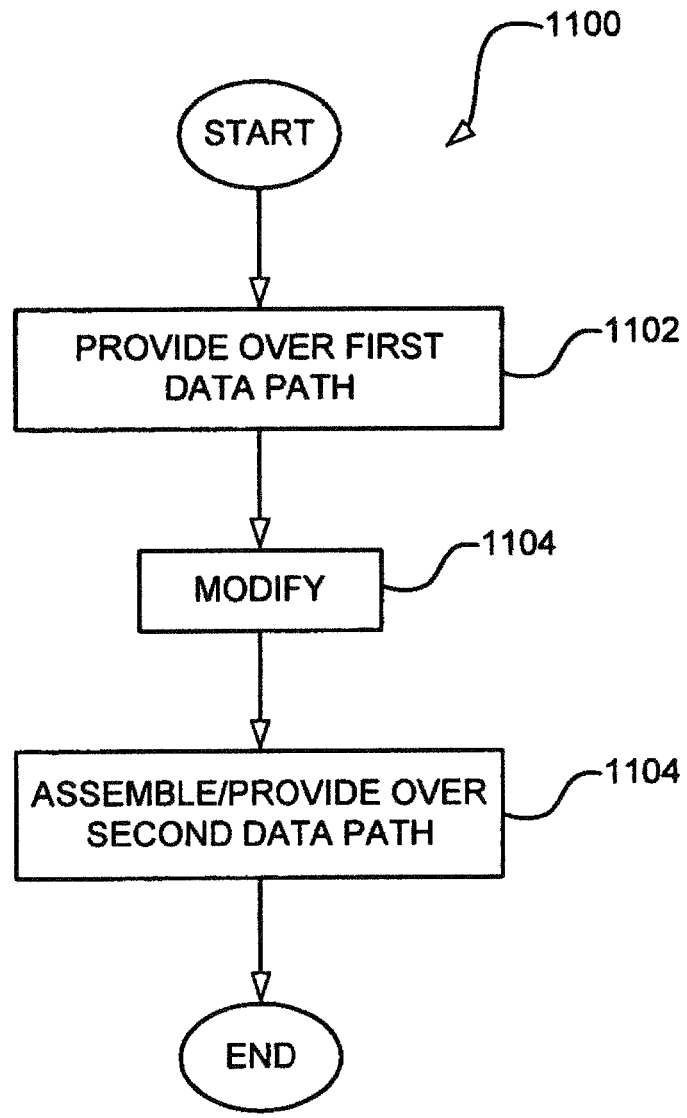
FIG. 11 is a flowchart of an embodiment of a method of modifying a packet in which sliced packet data is provided to a packet modification engine over a wide data path.

FIG. 11 is a flowchart of an embodiment 1100 of a method of modifying a packet. Step 1102 comprises providing some or all of a packet as packet portions and providing the portions in parallel over a first data path having a first width to a modification engine. Step 1104 comprises modifying, in the modification engine, one or more of the packet portions. Step 1106 comprises assembling a packet from the one or more modified and one or more unmodified packet portions, and providing the assembled packet over a second data path having a second width less than the first width.

Figure 12:
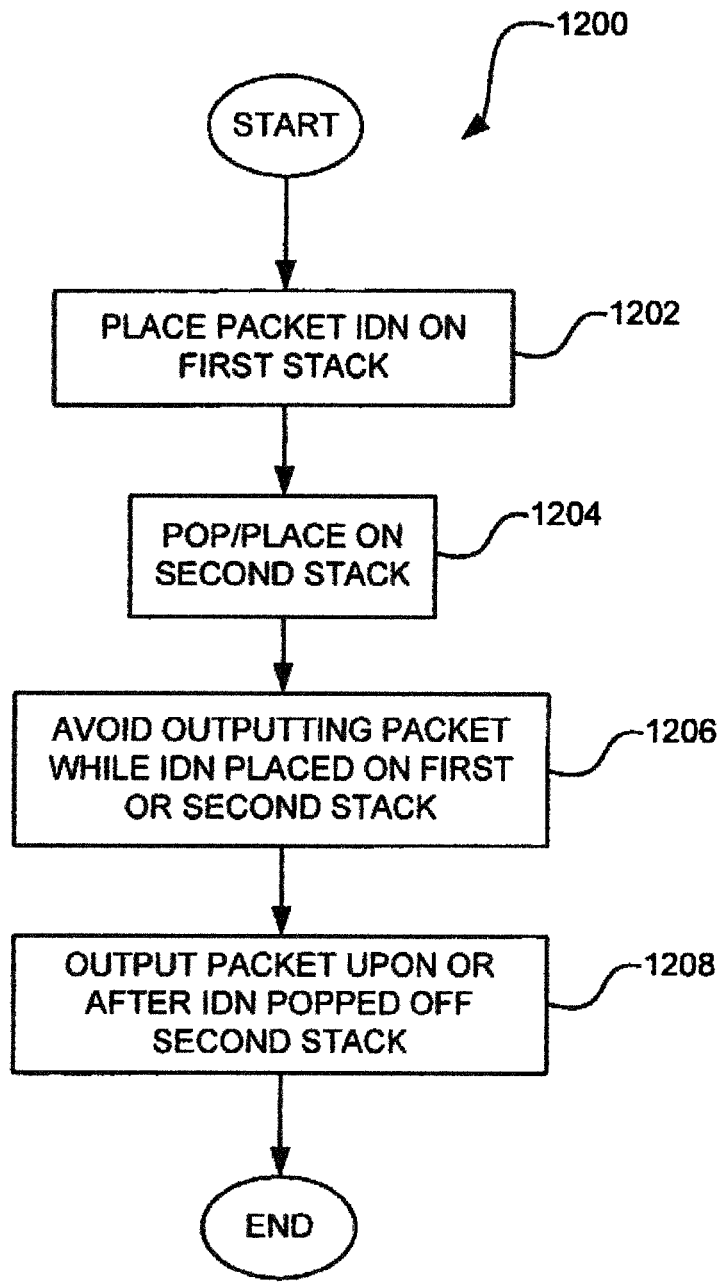
FIG. 12 is a flowchart of an embodiment of a method of controlling packet classification processing of a packet through first and second stacks.

FIG. 12 is a flowchart 1200 of an embodiment of a method of classifying a packet. Step 1202 comprises placing an identifier of a packet on a first FIFO buffer. Step 1204 comprises popping the identifier off the first FIFO buffer and placing it on a second FIFO buffer upon or after initiation of classification processing of the packet. Step 1206 comprises avoiding outputting the packet while an identifier of the same is placed on either the first or second FIFO buffers. Step 1208 comprises outputting the packet upon or after the identifier of the packet has been popped off the second FIFO buffer.

Figure 13:
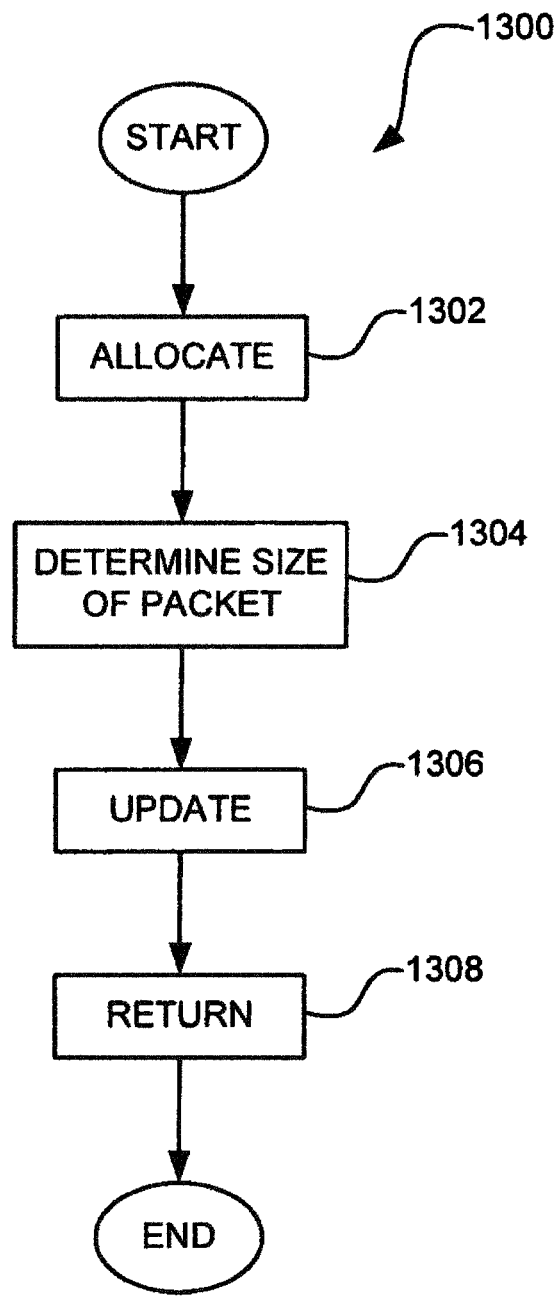
FIG. 13 is a flowchart of an embodiment of a method of maintaining packet statistics which involves allocating a packet size determiner to a packet from a pool of packet size determiners.

FIG. 13 is a flowchart illustrating an embodiment 1300 of a method of maintaining packet statistics. Step 1302 comprises allocating a packet size determiner to a packet from a pool of packet size determiners. Step 1304 comprises using the packet size determiner to determine the size of the packet. Step 1306 comprises updating one or more packet statistics responsive to the determined size of the packet. Step 1308 comprises returning the packet size determiner to the pool upon or after the same has determined the size of the packet.

In one implementation, the packet size determiner is a counter which counts the size of the packet. In a second implementation, the method further comprises queuing one or more statistics update requests.

In one implementation example, the one or more packet statistics indicate the cumulative size of packets which have met specified processing conditions or hits, and step 1306 comprises incrementing a cumulative size statistic for a particular processing condition or hit by the determined size of the packet if the packet meets that particular processing condition or hit.

Figure 14:
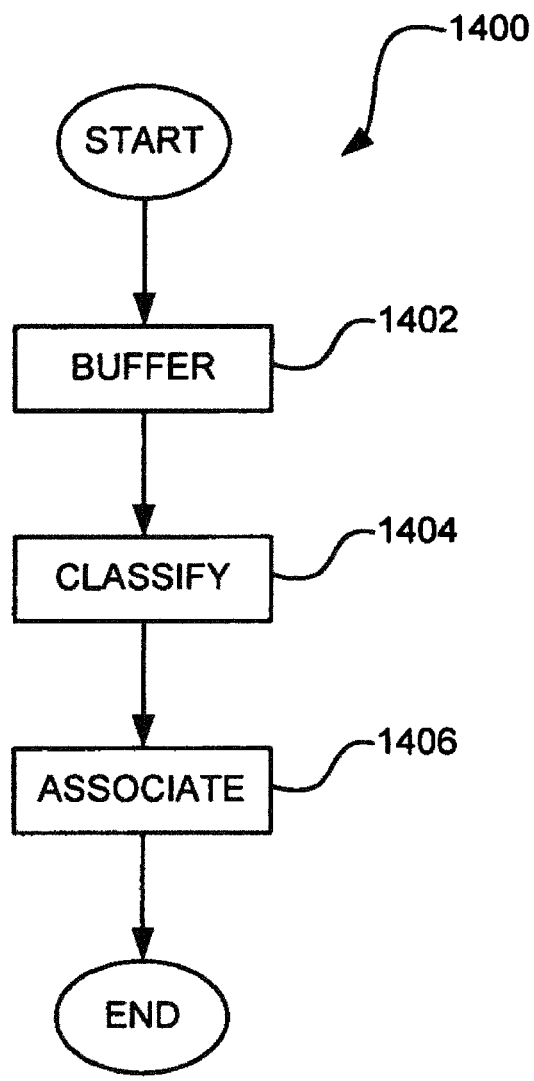
FIG. 14 is a flowchart of an embodiment of a method of classifying a packet which involves buffering the packet in a buffer upon or after ingress thereof, and associating packet classification data with the packet as retrieved directly from the buffer to form a classified packet on an egress data path.

FIG. 14 illustrates an embodiment 1400 of a method of classifying a packet. Step 1402 comprises buffering a packet in a buffer upon or after ingress thereof. Step 1404 comprises classifying the packet and providing data representative of the packet classification. Step 1406 comprises associating the data representative of the packet classification with some or all of the packet as directly retrieved from the buffer to form a packet on an egress data path.

In one implementation, step 1406 comprises multiplexing the data representative of the packet classification onto a data path followed by some or all of the packet as directly retrieved from the buffer.

Figure 15:
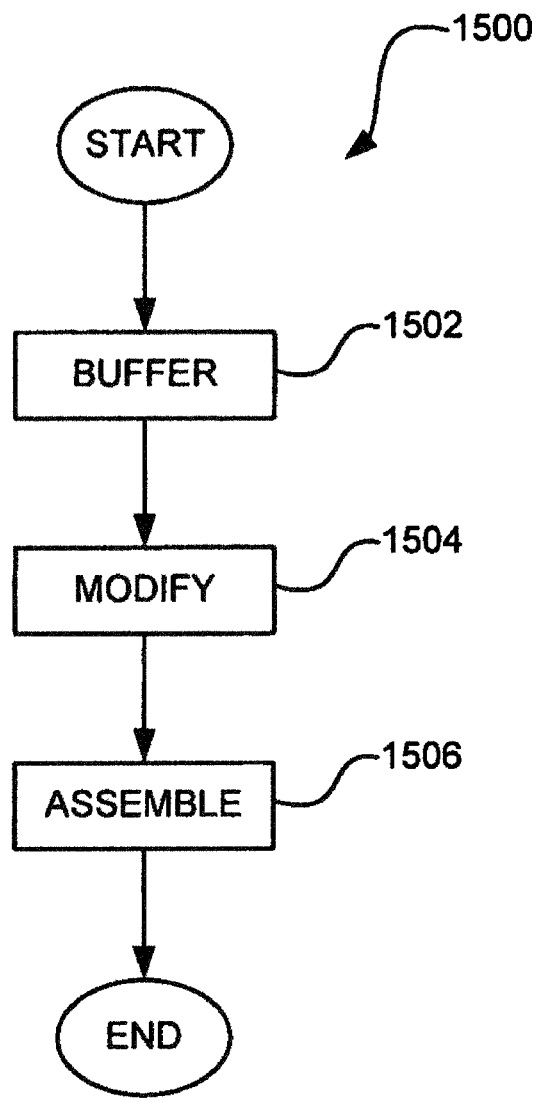
FIG. 15 is a flowchart of an embodiment of a method of modifying a packet which involves buffering the packet in a buffer upon or after ingress thereof, and assembling a packet on an egress data path from one or more modified portions of the packet, and one or more unmodified portions as retrieved directly from the buffer.

FIG. 15 illustrates an embodiment 1500 of a method of modifying a packet. Step 1502 comprises buffering the packet in a buffer upon ingress thereof. Step 1504 comprises modifying one or more portions of the packet. Step 1506 comprises assembling the one or more modified portions of the packet with one or more unmodified portions of the packet as retrieved directly from the buffer to form an assembled packet on an egress data path.

In one implementation, the method comprises providing a list indicating which portions of the assembled packet are to comprise modified portions of an ingress packet, and which portions are to comprise unmodified portions of the ingress packet, and step 1506 comprises assembling the assembled packet responsive to the list.

Figure 16:
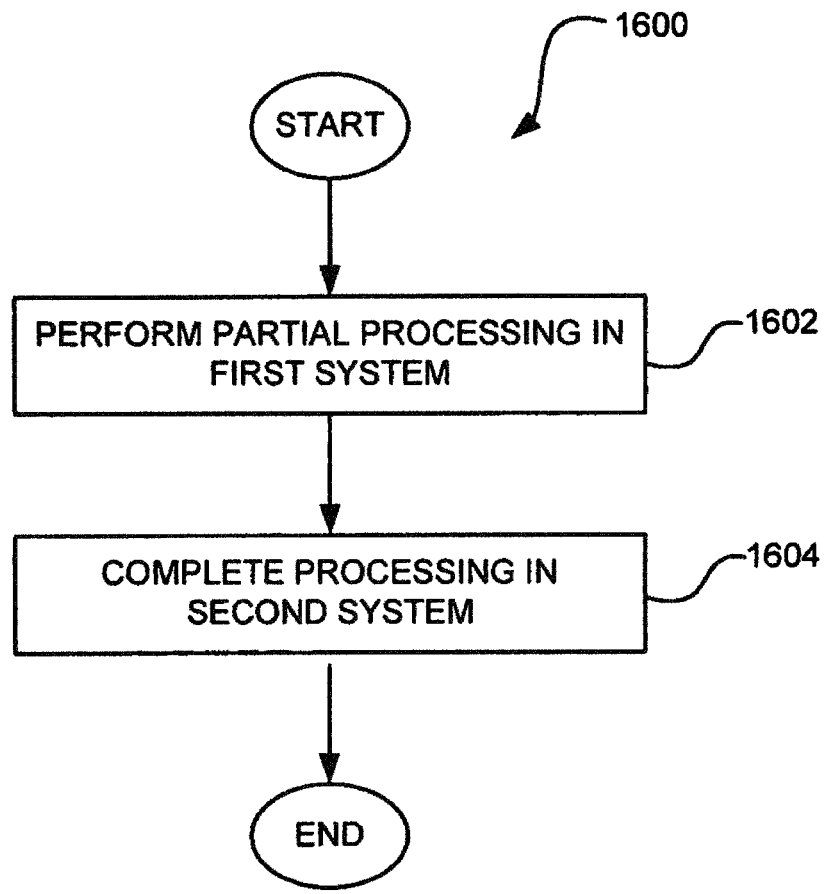
FIG. 16 is a flowchart of an embodiment of a method of performing classification processing of a packet in a cascaded combination of multiple, replicated packet classification systems.

FIG. 16 illustrates an embodiment 1600 of a method of processing a packet in a cascaded combination of multiple, replicated packet processing systems. In one implementation, each of systems is either a packet classification system or a packet modification system, and the processing which is performed by each system is either classification processing or modification processing as the case may be. Step 1602 comprises performing partial processing of a packet in a first of the replicated packet processing systems, and step 1604 comprises completing processing of the packet in a second of the replicated packet processing systems.

In one implementation, the second packet processing system is the last of a plurality of replicated packet processing systems, and the first packet processing system is either the first or next to last packet processing system in the plurality of packet processing systems, wherein partial processing of a packet is performed in the first replicated packet processing system, and processing is completed in the second replicated packet processing system.

Figure 17:
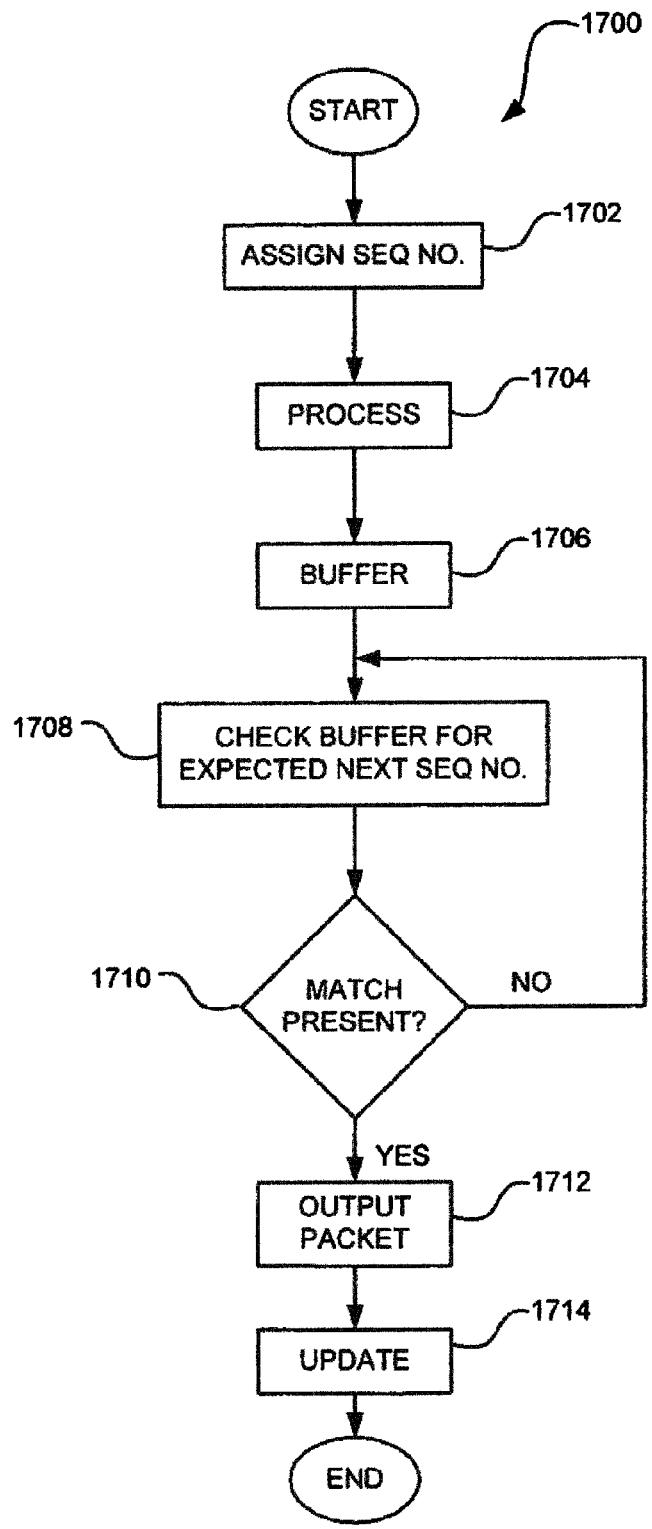
FIG. 17 is a flowchart of an embodiment of a method of preventing re-ordering of packets in a packet processing system.

FIG. 17 illustrates an embodiment 1700 of a method of preventing re-ordering of packets in a packet processing system. Step 1702 comprises assigning a sequence number to a packet upon or after ingress thereof to the system. Step 1704 comprises processing the packet. Step 1706 comprises storing data representative of the packet in a buffer. Step 1708 comprises checking the buffer for an entry matching an expected next sequence number. Inquiry step 1710 comprises determining if a match is present. If so, steps 1712 and 1714 are performed. Step 1712 comprises outputting the corresponding packet, and step 1714 comprises updating the expected next sequence number to reflect the outputting of the packet. If not, the method loops back to step 1708, thus deferring outputting a packet if a match is not present.

In one implementation, steps 1708-1714 comprise maintaining an expected next sequence number for each of a plurality of output channels, checking the buffer for a match for each of the channels, outputting the corresponding packet on a channel if a match for that channel is present and updating the expected next sequence number for that channel, and deferring outputting a packet on a channel if a match for that channel is not present.

Preferred Embodiments of the Invention

In one embodiment, the modification engine 422 illustrated in FIG. 4A comprises a programmable processor configured to perform one or more packet modifications. The programmable processor comprises a pipelined processor core configured to modify a packet through execution of one or more commands as retrieved from a first memory. In one embodiment, illustrated in FIG. 4A, the first memory is recipe RAM 418 containing commands staged from either external transmit SRAM 412 or internal recipe RAM 414.

Figure 18:
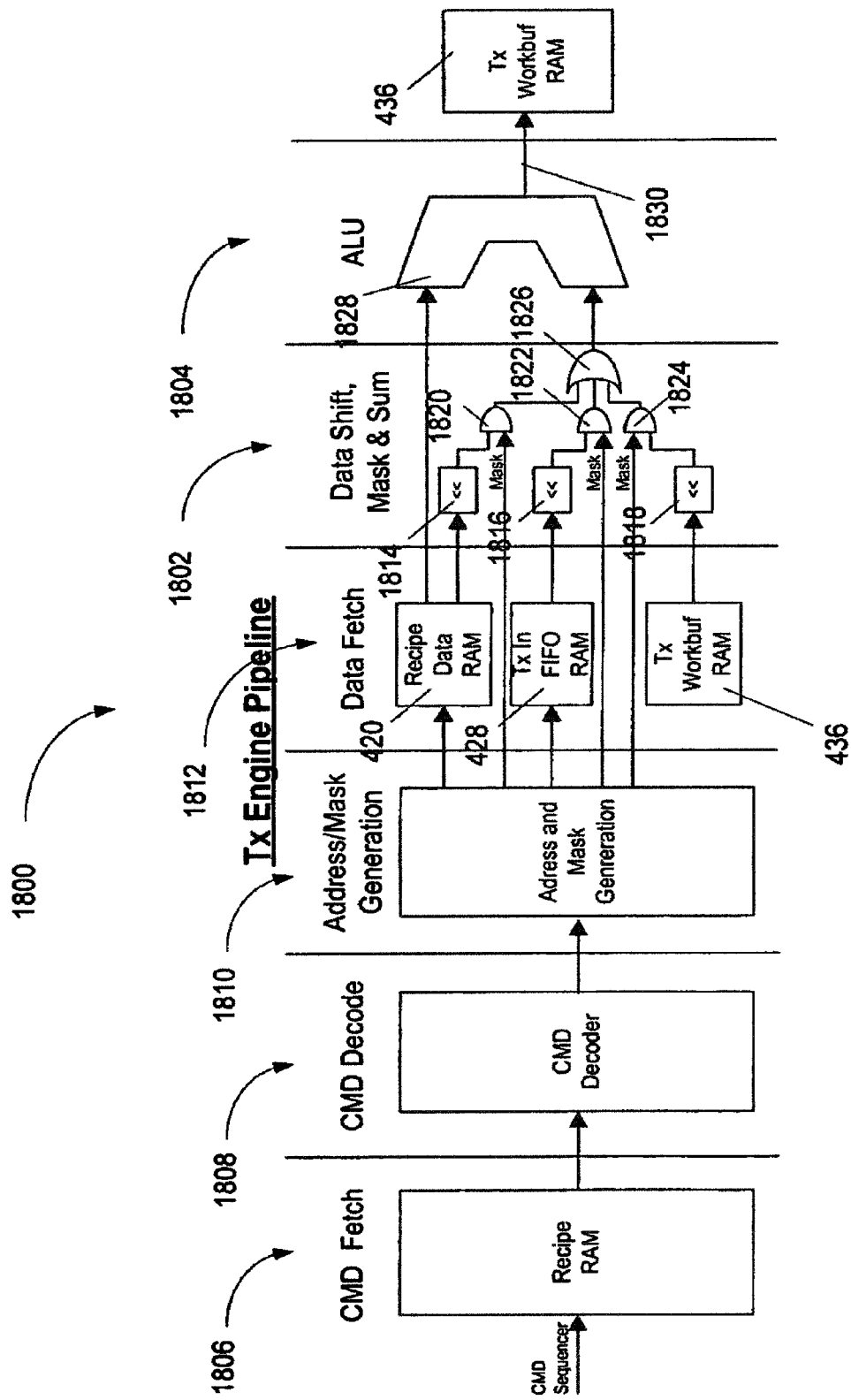
FIG. 18 illustrates one embodiment of a pipelined processor core of the modification engine.

FIG. 18 illustrates an embodiment 1800 of the pipelined processor core which comprises a first stage 1802 configured to selectively shift and mask data in each of a plurality of categories, including packet data and data as retrieved from a second memory, responsive to one or more decoded commands, and logically sum the selectively shifted and masked data in each of the categories. As illustrated, in this embodiment, the pipelined processor core comprises a second stage 1804 configured to selectively perform one or more operations on the logically summed data from the first stage, responsive to the one or more decoded commands. As illustrated, data from this second stage 1804 is stored in TX work buffer 436.

In one implementation, this data comprises a 64 bit data fragment, stored in TX work buffer 436, that will form part of an egress packet. The fragment is typically one of many fragments formed by the processor. The modified ones of these fragments are stored in the TX work buffer 436. The unmodified ones of these fragments are stored in Transmit In Data FIFO 428. The processor in this embodiment produces an ordered set of instructions for assembling the egress packet from these fragments.

In one embodiment, illustrated in FIG. 18, the pipelined processor core 1800 further comprises a command fetch stage 1806, a command decode stage 1808, and an address and mask generation stage 1810. In this embodiment, the command fetch stage 1806 is configured to fetch the one or more commands from the first memory, the command decode stage 1808 is configured to decode the one or more commands, and the address and mask generation stage 1810 is configured to generate one or more addresses and one or more masks for each of the commands.

In one implementation, the first stage 1802 is configured to selectively shift and mask data in each of several categories in response to a decoded command, and logically sum the selectively shifted and masked data in each of these several categories. In one example, this stage is implemented by selectively shifting the data in each of these several categories using one or more shifters 1814, 1816, 1818 as illustrated in FIG. 18, logically ANDing the shifted data with the associated masks in each of these several categories using one or more AND gates 1820, 1822, 1824, and then logically ORing the outputs of the respective AND dates 1820, 1822, 1824 using OR gate 1826.

In one implementation, the second stage 1804 is implemented through an arithmetic logic unit (ALU) 1828 configured to selectively perform, in response to one or more decoded commands, an arithmetic operation on the logical sum as produced by the OR gate 1826 using data as retrieved from the data RAM 420 and provided to the ALU 1828 through one or more signal lines 1830.

In one embodiment, the ALU 1828 is also configured to execute one or more NOP (no operation) instructions when it is desired to pass the data from the first stage through the ALU without alteration.

In one embodiment, the TXMI field in the AFH pre-pended to the packet as illustrated in FIG. 2 is used to locate a TXM link stored in external transmit SRAM 412. The TXM link may be an internal TXM link or an external TXM link. An internal TXM link contains a recipe pointer to a block of up to 32 commands (which may be referred to as a recipe) as stored in internal recipe RAM 414, and up to two data pointers, each to a burst of up to 16 lines of data stored in external transmit SRAM 412. An external TXM link contains a recipe pointer to a block of up to 32 commands as stored in the external transmit SRAM 412, and up to two data pointers, each to a burst of up to 16 lines of data stored in external SRAM 412.

FIG. 19 illustrates one example of the format 1900 of a 72 bit external TXM link. In this example, bits 0-17 comprise a first data pointer to a first data burst of up to 16 line entries of data stored in external transmit SRAM 412, bits 18-21 specify the length of this first burst, bits 22-41 comprise a second data pointer to a second data burst of up to 16 line entries of data stored in external transmit SRAM 412, bits 42-45 specify the length of this second burst, bits 46-65 comprises a recipe pointer to a recipe of up to 32 commands stored in external transmit SRAM 412, bits 66-69, specify the length of this recipe, bit 70 is set to logical 0 to indicate that the link is an external TXM link, and bit 71 is a parity bit set.

FIG. 20 illustrates one example of the format 2000 of a 72 bit internal TXM link. In this example, bits 0-20 comprise a first data pointer to a first data burst of up to 32 line entries of data stored in external transmit SRAM 412, bits 21-25 specify the length of this first burst, bits 26-46 comprise a second data pointer to a second data burst of up to 32 line entries of data stored in external transmit SRAM 412, bits 47-51 specify the length of this second burst, bits 52-62 comprises a recipe index or pointer to a recipe of up to 32 commands stored in internal recipe RAM 414, bits 63-67 specify the length of this recipe, bits 68-69 are reserved, bit 70 is set to logical 1 to indicate that the link is an internal TXM link, and bit 71 is a parity bit.

In both examples, the first and second data bursts pointed to by a TXM link are concatenated to form one set of data/masks for use by the associated recipe.

FIG. 21A illustrates one example of the format 2100 of a data line entry as stored in external transmit SRAM 412. In order to conserve space in the SRAM 412, multiple data sets may be packed in a single data line entry in this example. Bits 0-31 comprise a first data set and bits 36-67 comprise a second data set, each of which may contain data, mask, or combined data and mask information. Bits 32-35 indicate the cumulative length (in terms of 8-bit bytes) of each of the data sets, which are assumed to be the same length. Bit 71 is a parity bit.

In one example, if a data set contains a data field and a related mask field, the data field must precede its related mask field. Also, the data field and its related mask field must be contained in the same data set, and cannot be split between two data sets. FIG. 21B illustrates two examples of possible data line entry formats.

FIG. 22 illustrates one example of the format 2200 of a recipe line entry as stored either in external transmit SRAM 412 or internal recipe RAM 414. In order to conserve space in the SRAM 412 and the internal recipe RAM 414, two commands may be packed into a single recipe line entry in this example. Bits 0-33 specify a first command, bits 34-35 are reserved, bits 36-69 optionally specify a second command, and bit 70 indicates whether the second command is valid (present) or not. Bit 71 is a parity bit.

Figure 23:
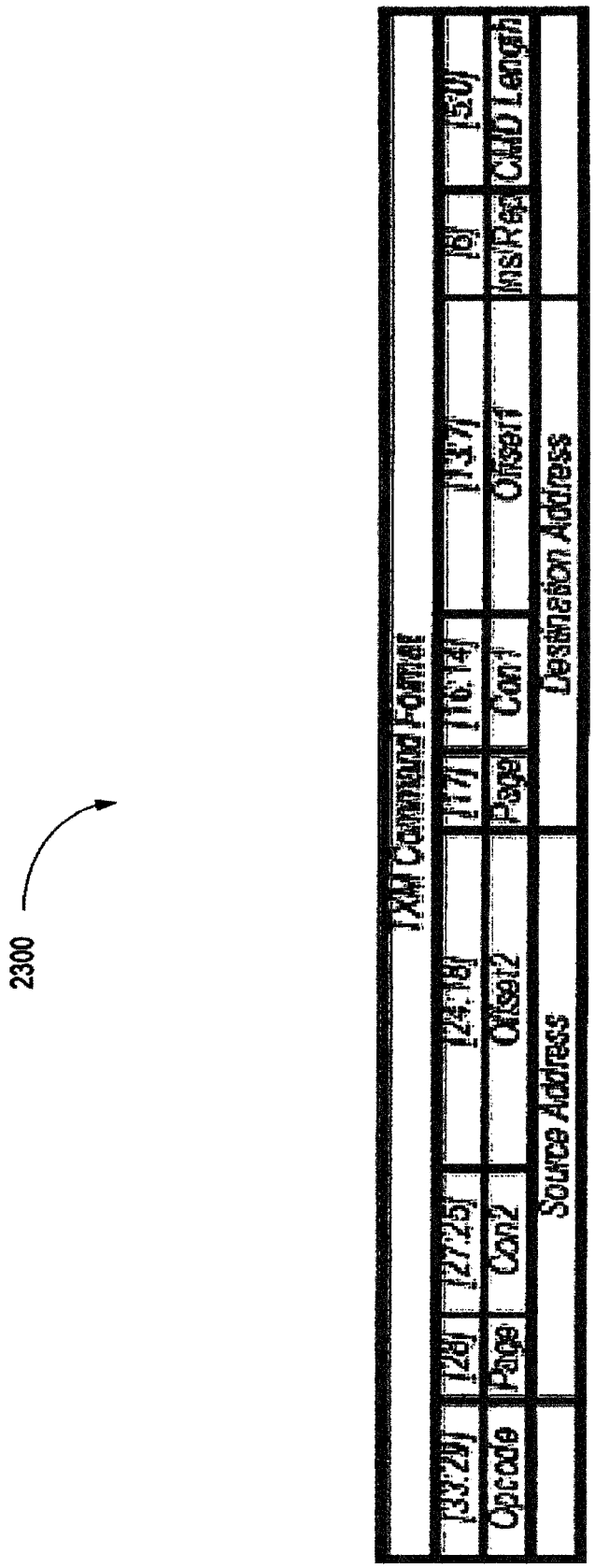
FIG. 23 illustrates one example of the format of a recipe command.

FIG. 23 illustrates one example of the format 2300 of a recipe command. In this example, bits 0-5 are a byte count pertaining to the size of the operation. Bit 6 is a flag indicating whether the command is a replace or insert command. A replace command overwrites existing packet data, while an insert command inserts data without overwriting existing packet data. Bits 7-17 are a destination address in the packet, expressed in terms of a page (bit 17), context (bits 14-16), and offset (bits 7-13). Bits 18-28 are a source address in the packet, again, expressed in terms of a page (bit 28), context (bits 25-27), and offset (bits 18-24). Bits 29-33 are an operation code.

The context field in the source and destination addresses is a pointer to an encapsulated layer of the packet, and the page bit indicates whether the context pointer is within a first and second page of the packet. This concept of pages is intended to allow for the handling of nested packets, i.e., an inner packet which forms the payload portion of an outer packet. If the first page is specified, the context pointer is assumed to point to an encapsulated layer within the outer packet. If the second page is specified, the context pointer is assumed to point to an encapsulated layer within the inner packet. The offset field is an offset from the associated context pointer.

The expression of source and destination addresses in terms of page, context, and offsets allows for relative addressing of packet data. These relative addresses are resolved against a particular packet through parsing of the packet as performed by the parser 130. As described earlier, this parser analyzes the packet and outputs context pointers pointing to the beginning of the encapsulated layers of the packet. In the case of nested packets, the parser also provides a pointer to the beginning of the outer packet, i.e., the first page, and the inner packet, i.e., the second page. During execution of commands, the source and destination within the packet of the specified operation can be readily determined using the addresses expressed in terms of page, context, and offsets and the page and context pointers output by the parser.

Figure 24:
FIG. 24 illustrates an example of context pointers as might be produced by the parser.

FIG. 24 illustrates an example 2400 of the context pointers that might be produced by the parser 130, and that might appear in the source and destination addresses of a recipe command. In this particular example, the first context pointer (C0) points to the start of the packet, which is also the beginning of the AFH; the second context pointer (C1) points to the start of the MAC header; the third context pointer (C2) points to the start of the Ethertype field (if present); the fourth context pointer (C3) points to the start of the MPLS header (if present); the fifth context pointer (C4) points to the start of the layer three (L3) header; the sixth context pointer (C5) points to the start of the inner L3 header; and the seventh context pointer (C6) pointer to the start of the layer four (L4) TCP/UDP header.

FIG. 25 is a table illustrating the possible operation codes (op codes) in one example 2500 of a recipe command instruction set. In this example:

The TXM_CMD_NOP command, with an op code of 00000, is a NOP command that burns a cycle of the modification engine 422, and performs no operation.

The TXM_CMD_INSERT command, with an op code of 00001, is an insert command that can insert up to 64 bytes of data into any destination in the packet up to byte number 0x78.

The TXM_CMD_DELETE command, with an op code of 00010, is a delete command, which deletes the number of bytes (up to 128) specified in the length field starting at the source address. A length field of zero means to delete all data in the packet up to the end of the source specified context.

The TXM_CMD_REPLACE command, with an op code of 00011, is a replace command, which can overwrite up to 64 bytes of data at any destination location in the packet up to byte number 0x78.

The TXM_CMD_REPLACE MASK command, with an op code of 00100, is a replace mask command, which can overwrite up to 32 bits of data that is masked with a 32-bit mask. The mask itself is located in the external data set for the command (the data from SRAM 412 that is staged to RAM 420) after the data to be masked.

The TXM_CMD_COPY command, with an op code of 00101, is a copy replace command that can overwrite up to 64 bits of data at any destination location in the packet up to byte number 0x78 with data supplied from any source location in the packet within the first 0x78 bytes of the packet.

The TXM_COPY_MASK command, with an op code of 01000, is a copy replace mask command that can overwrite up to 32 bits of data at any destination location in the packet with data supplied from any source location in the packet that is masked with a 32 bit mask obtained from the external data set for the command after the data field.

The TXM_CMD_COPY_INS command, with an op code of 00111, is a copy insert command that can insert up to 64 bits of data at any destination location in the packet up to byte number 0x78 with data supplied from any source location in the packet up to byte number 0x78.

The TXM_CMD_COPY_INS_MASK command, with an op code of 01000, is a copy insert mask command that can insert up to 32 bits of data at any destination location in the packet from any source location in the packet. The inserted data is masked with a 32 bit mask obtained from the external data set for the command after the data field.

The TXM_CMD_MACRO1 command, with an op code of 01001, is actually the macro illustrated in FIG. 26. This macro performs the following operation—replaces the MAC DA field in the packet with 6 byes of data taken from the data set for the macro; replaces the MAC SA field in the packet with 6 bytes of data taken from the external data set for the command if the register flag in the configuration register use_internal_mac_sa is set to 0; replaces the MAC SA field in the packet with 6 bytes of data from an internal register specified by the source field of the command (bits 0-15) if the register flag in the configuration register use_internal_mac_sa is set to 1; deletes the VLAN field if the VDEL flag is set to 1; and replaces the VLAN field with data from the external data set associated with the macro if the VDEL flag is set to 0.

The TXM_CMD_MACRO2 command, with an op code of 01010, is actually the macro illustrated in FIG. 27. This macro performs the following operation—replaces the MAC DA field in the packet with 6 byes of data taken from the data set for the macro; replaces the MAC SA field in the packet with 6 bytes of data taken from the external data set for the command if the register flag in the configuration register use_internal_mac_sa is set to 0; replaces the MAC SA field in the packet with 6 bytes of data from an internal register specified by the source field of the command (bits 0-15) if the register flag in the configuration register use_internal_mac_sa is set to 1; deletes the VLAN field if the VDEL flag is set to 1; and simply burns a cycle—by converting the txmi_cmd_vlan_delete command to a txm_cmd_nop—if the VDEL flag is set to 0.

The TXM_INCREMENT_INSERT command, with an op code of 10000, is an increment insert command that increments any field in the packet and then inserts the incremented field in the packet without overwriting the original field.

The TXM_INCREMENT_REPLACE command, with an op code of 10001, is an increment replace command that increments any field in the packet and then replaces the original field with the incremented field.

The TXM_CMD_DECREMENT command, with an op code of 10010, is a decrement command that decrements any field in the packet and then replaces the original field with the decremented field.

The TXM_CMD_AND command, with an op code of 10011, is an ALU command that logically ANDs up to 64 bytes of data from any location in the packet with data from the external data set associated with the command and stores the result in the TX work buffer 436.

The TXM_CMD_OR command, with an op code of 10100, is an ALU command that logically ORs up to 64 bytes of data from any location in the packet with data from the external data set associated with the command and stores the result in the TX work buffer 436.

The TXM_CMD_XOR command, with an op code of 10101, is an ALU command that logically XORs up to 64 bytes of data from any location in the packet with data from the external data set associated with the command and stores the result in the TX work buffer 436.

The TXM_CMD_ADD command, with an op code of 10110, is an ALU command that arithmetically adds up to 64 bytes of data from any location in the packet with data from the external data set associated with the command and stores the result in the TX work buffer 436.

The TXM_CMD_SUB command, with an op code of 10111, is an ALU command that arithmetically subtracts data from the external data set associated with the command form up to 64 bytes of data from any location in the packet and stores the result in the TX work buffer 436.

The TXM_TTL_DECREMENT command, with an op code of 11000, decrements and replaces the TTL field in the packet. The command uses the multicast and broadcast flags as output from parser 130 to determine which TTL decrement limit to use according to the pseudo code illustrated in FIG. 28. More specifically, according to this pseudo code, three TTL limits are possible: a broadcast TTL limit, a multicast TTL limit, and a unicast TTL limit. The broadcast TTL limit is used if a broadcast packet is involved; the multicast TTL limit if a multicast packet is involved; and the unicast TTL limit if a unicast packet is involved. If the TTL limit is reached, and TTL limit kill is enabled, the packet is flagged, the reject bit is set in the fragment/burst processor 442, and the MAC will kill the packet.

The TXM_TC_INCREMENT command, with an op code of 11001, increments and replaces the TC field in the packet. The command uses an increment limit to determine if the packet should be killed according to the pseudo code illustrated in FIG. 29. According to this pseudo code, if the TC limit is reached, the packet kill flag is set, signaling the fragment/burst processor 442 to kill the packet.

The TXM_TTL_DECREMENT_INS command, with an op code of 11010, is the same as the TXM_TTL_DECREMENT command except that, in lieu of overwriting the original TTL field with the decremented TTL field, this command inserts the decremented TTL field anywhere within the packet.

The TXM_TC_INCREMENT_INS command, with an op code of 11011, is the same as the TXM_TC_INCREMENT command except that, in lieu of overwriting the original TC field with the incremented TC field, this command inserts the incremented TC field anywhere within the packet.

The remaining commands illustrated in FIG. 25 are either Access Control List commands (ACL) or Egress Mark Commands (EMC). The ACL commands are designed to pass certain information—VPORT and index control information—from the recipe to the Transmit ACL logic 454 for ACL processing. The EMC commands are designed to perform egress marking functions.

Figure 30:
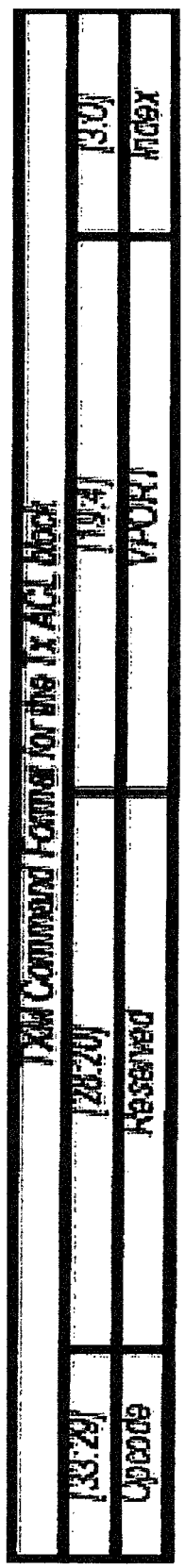
FIG. 30 illustrates one example of the format of an ACL command.
Figure 31:
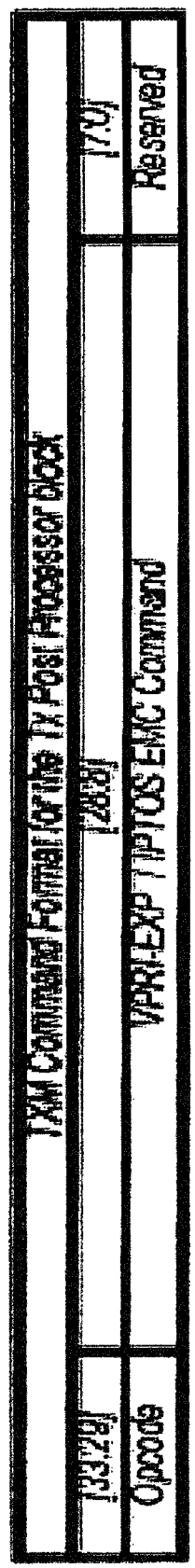
FIG. 31 illustrates one example of the format of an EMC command.

The format of the ACL commands is illustrated in FIG. 30 while the format of the EMC commands is illustrated in FIG. 31. The example instruction set of FIG. 25 provides the following ACL and EMC commands:

The TXM_CMD_ACL command, with an op code of 01101, provides TX_ACL direct index (for use in accessing the egress ACL CAM 460) and virtual port (VPORT) information to the transmit ACL logic 454 without burning a cycle of the modification engine 422.

The TXM_CMD_EMC_VPRI command, with an op code of 01110, controls the VPRI and EXP modification behavior of the transmit post processor block 452 without burning a cycle of the modification engine 422.

The TXM_CMD_EMC_IPTOS command, with an op code of 01111, controls the IPTOS modification behavior of the transmit post processor block 452 without burning a cycle of the modification engine 422.

FIG. 32 illustrates the exception conditions recognized in one embodiment of the modification engine 422 and the subsequent action taken, Turning back to FIG. 18, in one implementation, the address and mask generation stage 1810 is configured to generate four pointers and associated masks during each command cycle. The first is a pointer to packet data containing the point at which an operation is to occur within the packet, (as stored in either TX work buffer 436 or Transmit In Data FIFO 428) and its associated mask. The second is a pointer to insertion data as stored in data RAM 420 and its associated mask, which is to be inserted into the packet. The third is a pointer to copy data (as stored in either TX work buffer 436 or Transmit In Data FIFO 428) and its associated mask, representing packet data to be copied from one portion of the packet to another. The fourth is a pointer to residual packet data, i.e., packet data succeeding the point at which at which an operation is to occur within the packet, (as stored in either TX work buffer 436 or Transmit In Data FIFO 428) and its associated mask. The data fetch stage 1812 then uses these pointers to retrieve the data in each of these four categories and their associated masks. The data shift, mask & sum stage 1802 masks (and shifts as appropriate) the data in each of these four categories with their associated masks, and logically sums the masked data in each of the four categories. The ALU stage 1804 then performs an arithmetic or logical operation on this data as appropriate using data retrieved from data RAM 420, and stored the result in TX work buffer 436.

In one example, the data shift, mask & sum stage 1802 derives a data address in the Transmit In Data FIFO 428 (for each of one or more of the four categories as appropriate) as a function of the current command decode and the previous command decode (if any). For example, if a first command deleted n bytes from a packet, where n is an arbitrary integer, the corresponding data address in the Transmit In Data FIFO 428 would have to be shifted left by n bytes to compensate for the deleted data. Conversely, if the first commend added m bytes to the packet, where m is an arbitrary integer, the corresponding data address in the Transmit In Data FIFO 428 would have to be shifted right by the m bytes to compensate for the added data. In this example, the mask addresses (for each of one or more of the four categories as appropriate) would similarly be derived as a function of the current command decode and the previous command decode (if any).

Figure 33:
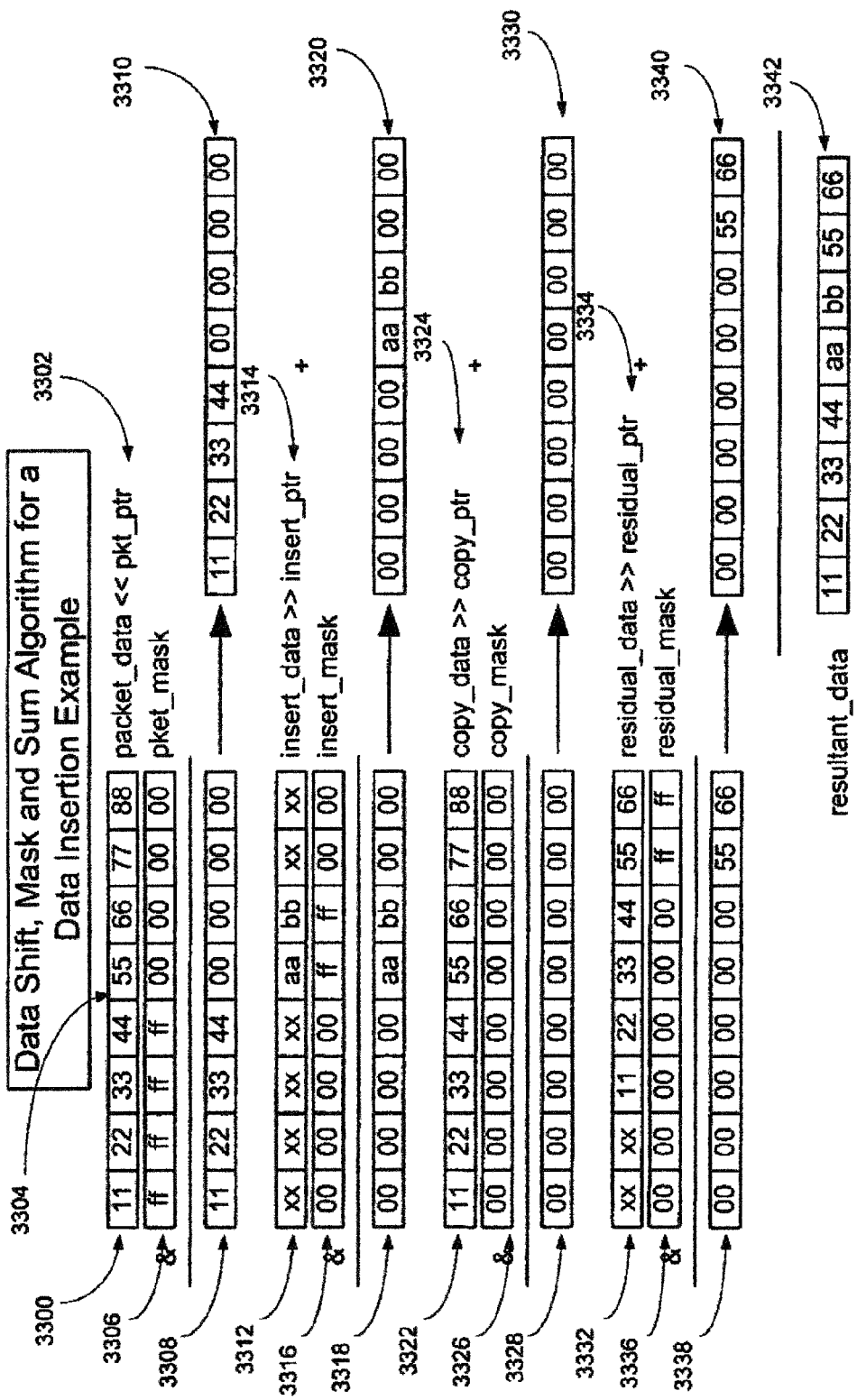
FIG. 33 illustrates the shifting and masking operations that underlie one example of a packet insertion operation.

FIG. 33 illustrates this process in the context of an insertion operation. Numeral 3300 identifies an 8 byte segment of packet data containing the point 3304 at which an insertion operation is to occur. Numeral 3302 identifies a pointer to this packet segment. Numeral 3306 identifies the associated mask for the segment. Note that this mask is all logical 1s prior to the location 3304 at which the insertion operation is to occur, and all logical 0s after this point. Numerals 3308 and 3310 both identify the result of logically ANDing the mask with the data segment.

Numeral 3312 identifies an 8 byte segment containing the two bytes 'aa bb' to be inserted into the packet, and numeral 3314 identities a pointer to this 8 byte segment. Numeral 3316 identifies the associated mask. Note that the mask is all logical 1s for the two bytes corresponding to the two bytes to be inserted, and all logical 0s otherwise. Numerals 3318 and 3320 both identify the result of logically ANDing the mask with the data segment.

Numeral 3322 identities an 8 byte segment of copy data, and numeral 3330 identifies a pointer to this copy data. Numeral 3326 identifies the associated mask, which is all logical 0s because a copy operation is not assumed to be occurring. Numerals 3328 and 3330 both identify the result of logically ANDing the mask with the associated copy data. Again, because a copy operation is not assumed, the result is all logical 0s.

Numeral 3332 identifies an 8 byte segment of residual packet data, and numeral 3334 identifies a pointer to this segment. Note that this segment is the original 8 byte segment 3300 shifted to the right by two bytes to accommodate the insertion data 'aa bb.' Numeral 3336 identifies the associated mask. Note that this mask is all logical 1s for the two bytes of residual packet data to be retained at the far right, but is logical 0 otherwise. Numerals 3338 and 3340 identify the result of logically ANDing the mask with the associated segment.

Numeral 3342 is the result of logically ORing the masked data in each of the four categories. Note that it comprises the original 8 bytes segment with the two bytes 'aa bb' inserted at the location 3304.

Figure 34:
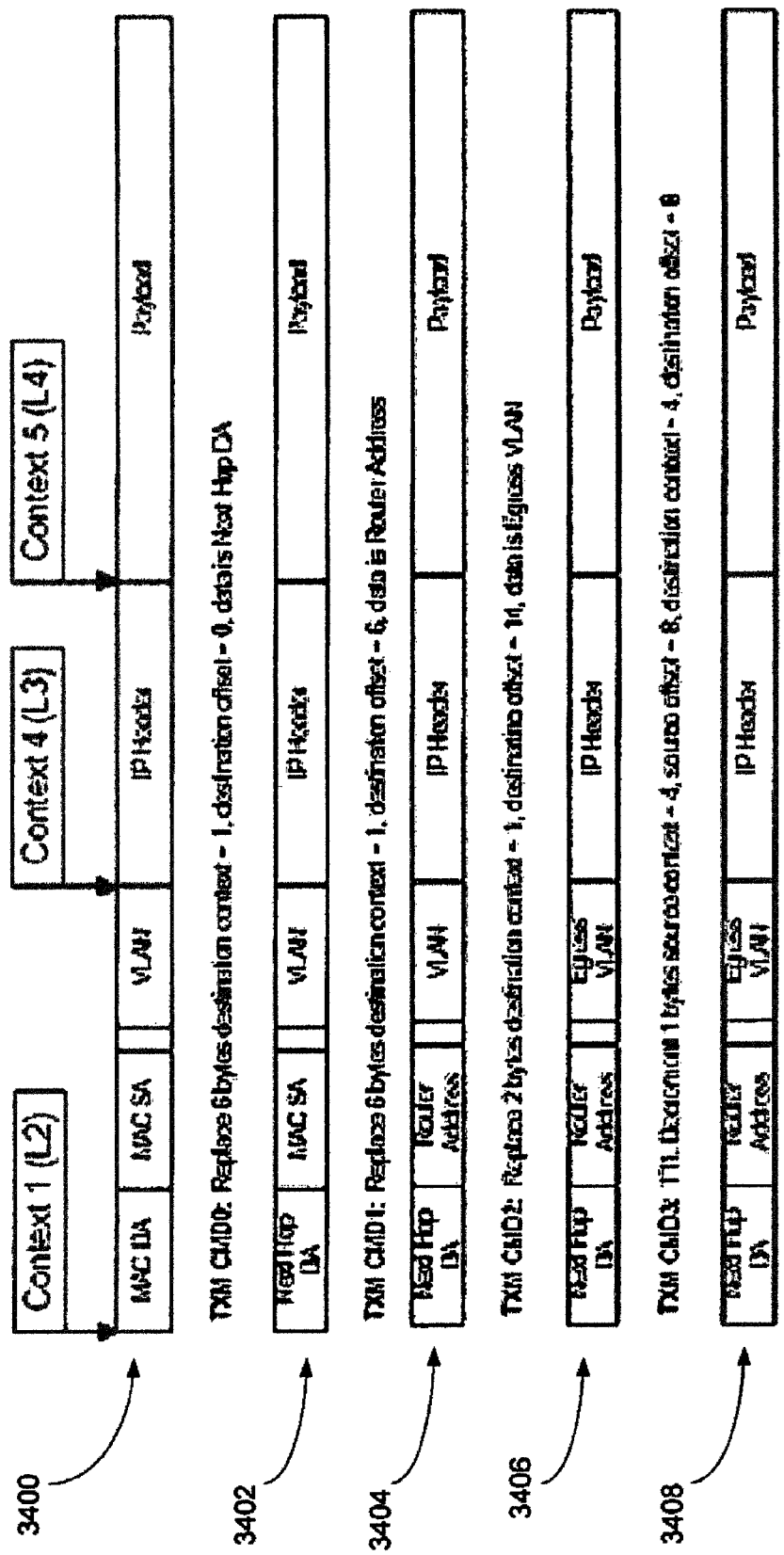
FIG. 34 illustrates one example of a command sequence for performing a MAC Header Replacement operation.

FIG. 34 illustrates an example of a typical packet operation performed by executing a sequence of four commands.

Numeral 3400 identifies the original packet with context pointers as produced by the parser 424 identifying the start of layers 2, 3 and 4, respectively. Numeral 3402 identifies the result of performing the first command: replacing the MAC DA with the next hop DA. Numeral 3404 identifies the result of performing the second command: replacing the MAC SA with the Router Address. Numeral 3406 identifies the result of performing the third command: replacing the VLAN with an Egress VLAN. Numeral 3408 identifies the result of performing the fourth command: decrementing the TTL field within the IP Header.

FIGS. 35-45 illustrate the commands or command sequences for performing several examples of common packet modification operations. FIG. 35 illustrates the commands for performing the following packet modification operations:

Next Hop MAC DA Replacement
Next Hop VLAN ID Replacement
Source Address Insertion
TTL Decrement IPv4
MPLS Stack Single Entry Add/Delete
MPLS Stack Double Entry Add/Delete
MPLS Label Change
MPLS TTL Decrement
MPLS TTL Copy
MPLS EtherType Replace/Restore
IPv4 Encapsulate/De-Encapsulate FIGS. 36-43 illustrate the command sequences for the following modification operations:

FIG. 36—MAC Header Replacement (illustrated in FIG. 34)
FIG. 37—IPv4-in-IPv4 Encapsulation
FIG. 38—IPv4-in-IPv4 De-Encapsulation
FIG. 39—IPv6-in-IPv4 Encapsulation
FIG. 40—IPv6-in-IPv6 Encapsulation
FIG. 41—IPX Operation
FIG. 42—MPLS Stack Single Entry Add/Delete
FIG. 43—MPLS Stack Double Entry Add/Delete
FIG. 44—Single Entry MPLS Label Change
FIG. 45—Network Address Translation (NAT)

Figure 46:
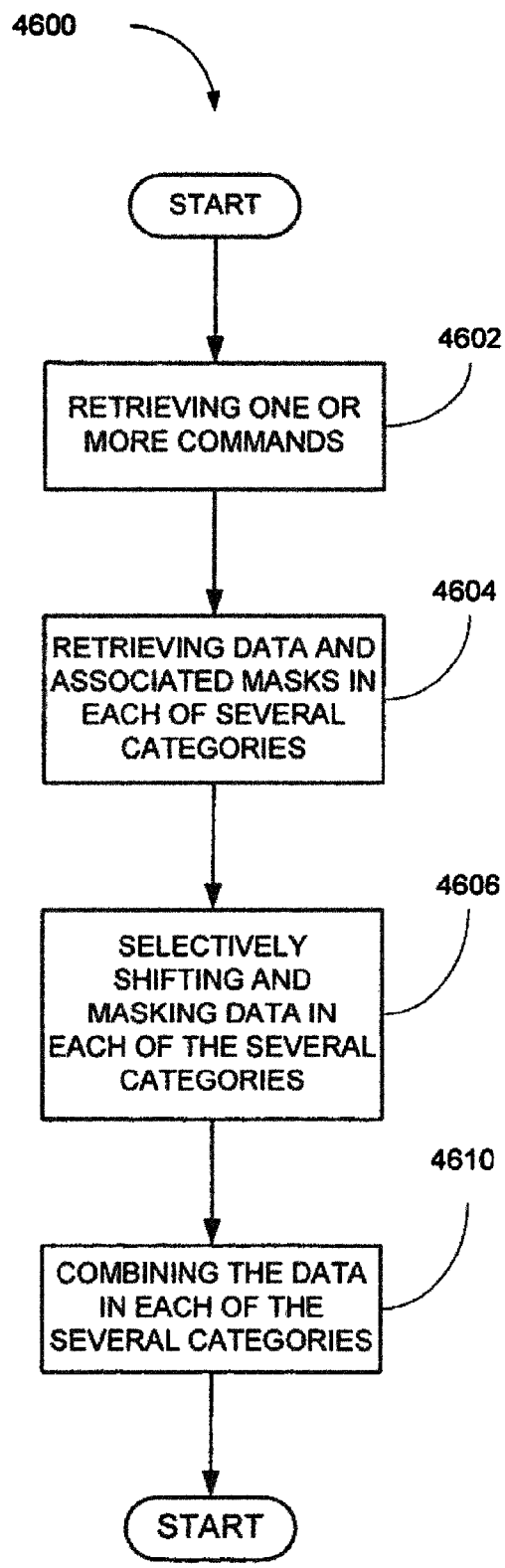
FIG. 46 is a flowchart of one embodiment of a method of performing a packet modification operation.

FIG. 46 is a flowchart of one embodiment 4600 of a method of performing one or more packet modifications in a programmable processor. In this embodiment, the method comprises step 4602, retrieving one or more commands, and step 4604, retrieving data and associated masks in each of a plurality of categories responsive to one or more decoded commands, the plurality of categories comprising packet data and other data.

The method further comprises step 4606, selectively shifting and masking the data in each of the plurality of categories responsive to one or more decoded commands, and step 4608, combining the selectively shifted and masked data in each of the categories.

In one implementation, the steps of the method are performed in a pipelined processor core. In one implementation example, the processor and processor core are implemented as an ASIC.

In one embodiment, the plurality of categories comprises packet data, insertion or replacement data, copy data, and residual packet data. In one example, at least one of the commands executed by the processor core specifies a source or destination address in terms of a packet context and offset. In a second example, at least one of the commands executed by the processor specifies a source or destination address in terms of a packet page, context and offset.

In one configuration, at least one of the commands executed by the processor is a copy/insert command for copying data from a first portion of the packet and inserting it at a position within a second portion of the packet. In a second configuration, at least one of the commands executed by the processor is a copy/replace command for copying data from a first portion of the packet and replacing data from a second portion of the packet with the data from the first portion of the packet.

While various embodiments of the invention have been described, it will be apparent to those of ordinary skill in the art that many more embodiments and implementations are possible that are within the scope of this invention.

What is claimed is:

1. A packet modification system comprising:
   a packet slicer to receive a complete packet at the packet modification system and slice the complete packet into a plurality of packet portions;
   a transmit-in-data buffer to receive and store the plurality of packet portions from the packet slicer;
   the transmit-in-data buffer to pass, in parallel, the plurality of packet portions to a modification engine of the packet modification system;
   a packet modification engine to effect a modification to one or more of the plurality of packet portions via a programmable processor core coupled with the packet modification engine by implementing at least the following operational stages at the programmable processor core:
   (i) a command fetch stage to fetch one or more commands to effect the modification on the one or more packet portions,
   (ii) a data fetch stage to fetch insertion and/or replacement data for use by the one or more commands, and
   (iii) an address and mask generation stage to generate four pointers and associated masks during each command cycle of the programmable processor core, the four pointers comprising: (a) a first pointer to packet data indicating a location where an operation is to occur among the plurality of packet portions, (b) a second pointer to insertion data which is to be inserted into one or more of the packet portions, (c) a third pointer to copy data which is to be copied from one of the packet portions and into another of the packet portions, and (d) a fourth pointer to residual packet data which is to come after the location where the operation is to occur among the plurality of packet portions as specified via the first pointer;
   wherein the data fetch stage follows the first, second, third, and fourth pointers to retrieve the data specified for use in completing the modification to the one or more packet portions via the programmable processor core; and
   a packet assembler to re-assemble the plurality of packet portions, including the one or more packet portions having been modified, into a modified complete packet for egress transmission from the packet modification system.

2. The packet modification system of claim 1, wherein the operational stages at the programmable processor core further includes a command decode stage.

3. The packet modification system of claim 1, wherein the address and mask generation stage is to selectively shift and mask data from four or more categories in response to a decoded command determined by the command decode stage, the four or more categories comprising (a) the first pointer to packet data indicating a location where an operation is to occur among the plurality of packet portions, (b) the second pointer to insertion data which is to be inserted into one or more of the packet portions, (c) the third pointer to copy data which is to be copied from one of the packet portions and into another of the packet portions, and (d) the fourth pointer to residual packet data which is to come after the location where the operation is to occur among the plurality of packet portions as specified via the first pointer.

4. The packet modification system of claim 1, wherein at least one of the commands to effect the modification on the one or more packet portions specifies a source or destination address in terms of a packet context and offset.

5. The packet modification system of claim 1, wherein at least one of the commands to effect the modification on the one or more packet portions is a copy/insert command for copying data from a first one of the packet portions for the packet and inserting the copied data into a second one of the packet portions for the packet.

6. The packet modification system of claim 1, wherein at least one of the commands to effect the modification on the one or more packet portions is a copy/replace command for copying data from a first one of the packet portions for the packet and replacing original data in a second one of the packet portions for the packet with the copied data.

7. The packet modification system of claim 1, wherein the programmable processor core is implemented as an application specific integrated circuit (ASIC) on an integrated circuit chip.

8. The packet modification system of claim 1, wherein the operational stages at the programmable processor core further include:
  a command decode stage to decode the one or more commands fetched; and
  wherein the command fetch stage is to fetch the one or more commands from a first memory of the packet modification system for decoding.

9. The packet modification system of claim 8, wherein the operational stages at the programmable processor core further include:
  the address and mask generation stage generate one or more addresses and one or more masks for each of the commands fetched and decoded;
  wherein the modification includes at least:
    (a) selectively shifting and masking data in each of several categories in response to a decoded command,
    (b) logically summing the selectively shifted and masked data in each of the several categories via one or more shifters,
    (c) logically ANDing the selectively shifted data via the masked data in each of the several categories using one or more AND gates, and
    (d) logically ORing the outputs of the respective AND gates using an OR gate.

10. The packet modification system of claim 9, further comprising:
  an Arithmetic Logic Unit (ALU) to selectively perform, in response to the one or more decoded commands, an arithmetic operation on the logical sum as produced by the OR gate using data as retrieved from memory and provided to the ALU through one or more signal lines; and
  wherein the ALU is to further perform a NOP (no operation) instruction on at least one of the plurality of packet portions where data of the at least one packet portion is to pass through the ALU without alteration according to the decoded command for the respective at least one packet portion.

11. The packet modification system of claim 8, wherein the operational stages at the programmable processor core further include:
  the address and mask generation stage generate, for each of the decoded commands, a first pointer to packet data designating a location for data to be replaced and/or inserted within the one or more of the plurality of packet portions.

12. The packet modification system of claim 11:
  wherein the address and mask generation stage to further generate a second pointer to insertion and/or replacement data; and
  wherein the address and mask generation stage is to further identify associated masks for respective packet portions of the packet to be applied by logically ANDing shifted data with the associated masks.

13. The packet modification system of claim 12, wherein the data fetch stage is to fetch the insertion and/or replacement data based on the second pointer generated by the address and mask generation stage.

14. The packet modification system of claim 1, wherein the operational stages at the programmable processor core further include:
  the address and mask generation stage generate one or more addresses and one or more masks for each of the one or more commands fetched; and
  a shift and mask stage to modify the one or more packet portions with the fetched insertion and/or replacement data based on the mask for the respective packet portion by shifting left or right by a number of bytes equal to a number of bytes to be added or deleted from the one or more packet portions based on the one or more commands.

15. The packet modification system of claim 1:
  wherein the packet assembler is to produce an ordered set of instructions for assembling the modified complete packet for egress transmission from the one or more of the plurality of packet portions; and
  wherein the packet assembler to re-assemble the plurality of packet portions comprises the packet assembler to re-assemble the plurality of packet portions into the modified complete packet for egress transmission from the packet modification system using the ordered set of instructions.

16. The packet modification system of claim 1, further comprising:
  a first memory of the packet modification system to store unmodified packet portions;
  a second memory of the packet modification system to store commands for use by the packet modification system;
  a third memory of the packet modification system to store modified packet portions; and
  wherein the first memory, the second memory, and the third memory each comprise physically separate and distinct physical memories within the packet modification system.

17. A method in a packet modification system, wherein the method comprises:
  receiving a complete packet at the packet modification system;
  slicing, via a packet slicer of the packet modification system, the complete packet into a plurality of packet portions;
  receiving and storing via a transmit-in-data buffer of the packet modification system, the plurality of packet portions from the packet slicer;
  passing in parallel, via the transmit-in-data buffer, the plurality of the packet portions to a modification engine of the packet modification system;
  modifying, via a packet modification engine, one or more of the plurality of packet portions by implementing the following operational stages via a programmable processor core coupled with the packet modification engine:
- (i) a command fetch stage to fetch one or more commands to effect the modification on the one or more packet portions, and
- (ii) a data fetch stage to fetch insertion and/or replacement data for use by the one or more commands, and
- (iii) an address and mask generation stage to generate four pointers and associated masks during each command cycle of the programmable processor core, the four pointers comprising: (a) a first pointer to packet data indicating a location where an operation is to occur among the plurality of packet portions, (b) a second pointer to insertion data which is to be inserted into one or more of the packet portions, (c) a third pointer to copy data which is to be copied from one of the packet portions and into another of the packet portions, and (d) a fourth pointer to residual packet data which is to come after the location where the operation is to occur among the plurality of packet portions as specified via the first pointer;

wherein the data fetch stage follows the first, second, third, and fourth pointers to retrieve the data specified for use in completing the modification to the one or more packet portions via the programmable processor core; and re-assembling, via a packet assembler of the packet modification system, the plurality of packet portions into a modified complete packet for egress transmission from the packet modification system.

18. The method of claim 17:

wherein the packet modification engine further implements an operational stage for producing an ordered set of instructions for assembling the modified complete packet for egress transmission from the one or more of the plurality of packet portions; and wherein the re-assembling comprises re-assembling the plurality of packet portions into the modified complete packet for egress transmission from the packet modification system using the ordered set of instructions.

19. The method of claim 17:

wherein the transmit-in-data buffer comprises a plurality of first-in-first-out (FIFO) memory buffers, each of the plurality of FIFO memory buffers coupled with the modification engine in parallel; and wherein passing in parallel, the plurality of the packet portions to the modification engine comprises passing in parallel, the plurality of the packet portions to the modification engine via the plurality of FIFO memory buffers.

20. A non-transitory processor-readable storage medium having instructions stored thereon that, when executed by a packet modification system, cause the packet modification system to perform a method comprising:

receiving a complete packet at the packet modification system;

slicing, via a packet slicer of the packet modification system, the complete packet into a plurality of packet portions;

receiving and storing via a transmit-in-data buffer of the packet modification system, the plurality of packet portions from the packet slicer;

passing in parallel, via the transmit-in-data buffer, the plurality of the packet portions to a modification engine of the packet modification system;

modifying, via a packet modification engine, one or more of the plurality of packet portions by implementing the following operational stages via a programmable processor core coupled with the packet modification engine:
- (i) a command fetch stage to fetch one or more commands to effect the modification on the one or more packet portions, and
- (ii) a data fetch stage to fetch insertion and/or replacement data for use by the one or more (ii) a data fetch stage to fetch insertion and/or replacement data for use by the one or more commands, and
- (iii) an address and mask generation stage to generate four pointers and associated masks during each command cycle of the programmable processor core, the four pointers comprising: (a) a first pointer to packet data indicating a location where an operation is to occur among the plurality of packet portions, (b) a second pointer to insertion data which is to be inserted into one or more of the packet portions, (c) a third pointer to copy data which is to be copied from one of the packet portions and into another of the packet portions, and (d) a fourth pointer to residual packet data which is to come after the location where the operation is to occur among the plurality of packet portions as specified via the first pointer;

wherein the data fetch stage follows the first, second, third, and fourth pointers to retrieve the data specified for use in completing the modification to the one or more packet portions via the programmable processor core; and re-assembling, via a packet assembler of the packet modification system, the plurality of packet portions into a modified complete packet for egress transmission from the packet modification system.

* * * * *